(12) United States Patent
Hao et al.

(10) Patent No.: US 9,826,012 B2
(45) Date of Patent: Nov. 21, 2017

(54) ESTABLISHMENT AND SYNCHRONIZATION OF A VIRTUAL THEATER BASED ON TRANSACTION INFORMATION AND PLAYBACK PREFERENCE INFORMATION

(71) Applicant: Verizon and Redbox Digital Entertainment Services, LLC, Basking Ridge, NJ (US)

(72) Inventors: Jianxiu Hao, Acton, MA (US); Gaurav A. Tanna, Brighton, MA (US); Gaurav D. Mehta, Brookline, MA (US); Ishan Awasthi, Wilmington, MA (US); Gong Zhang, Waltham, MA (US); Fred Scheer, Bradford, MA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 339 days.

(21) Appl. No.: 14/077,738

(22) Filed: Nov. 12, 2013

(65) Prior Publication Data

US 2015/0134724 A1    May 14, 2015

(51) Int. Cl.
    *H04L 29/06*    (2006.01)
    *G06F 15/16*    (2006.01)
    *H04L 29/08*    (2006.01)

(52) U.S. Cl.
    CPC .......... *H04L 65/60* (2013.01); *H04L 65/1069* (2013.01); *H04L 65/1093* (2013.01);
    (Continued)

(58) Field of Classification Search
    CPC . H04L 65/60; H04L 65/1069; H04L 65/1093; H04L 67/30; H04H 60/80; H04N 21/47202; G06Q 30/02
    (Continued)

(56) References Cited

U.S. PATENT DOCUMENTS 8,120,637 B2 *  2/2012  Baird ..................... H04H 60/80
                                              348/14.08
8,190,683 B2 *  5/2012  Sloo ................... H04N 7/17318
                                              709/204

(Continued)

OTHER PUBLICATIONS

Schahram Dustdar, Service Engineering: European Research Results, Aug. 2010, SpringerWienNewYork, ISBN 978-3-7091-0414-9, p. 13.*

(Continued)

*Primary Examiner* — David Lazaro
*Assistant Examiner* — Zi Ye

(57) ABSTRACT

A device may receive a request to establish a virtual theater. The device may provide, to multiple user devices, information regarding a transaction and one or more playback options for the virtual theater. The transaction may relate to establishing the virtual theater. The device may receive, from the multiple user devices, playback preference information based on the one or more playback options. The device may establish the virtual theater based on receiving the playback preference information and based on providing the information regarding the transaction. The device may provide, to the multiple of user devices, media content via the virtual theater based on the playback preference information.

20 Claims, 25 Drawing Sheets

(52) U.S. Cl.
CPC ........ *H04L 65/403* (2013.01); *H04L 65/4084* (2013.01); *H04L 67/30* (2013.01); *H04L 67/42* (2013.01)

(58) Field of Classification Search
USPC .............. 709/203–206, 219, 227; 348/14.09; 705/14.36
See application file for complete search history.

(56) References Cited

U.S. PATENT DOCUMENTS

| | | | |
|---|---|---|---|
| 8,909,740 B1 * | 12/2014 | Bliss .................... | G06F 1/12 709/219 |
| 2006/0026059 A1 * | 2/2006 | Grosz .................... | G06Q 30/02 705/14.51 |
| 2012/0271706 A1 * | 10/2012 | Ransom ................. | G06Q 30/02 705/14.36 |
| 2014/0214504 A1 * | 7/2014 | Young .................. | G06Q 10/109 705/14.5 |
| 2014/0214920 A1 * | 7/2014 | Wong ............... | H04N 21/47202 709/203 |

OTHER PUBLICATIONS

Chris Gayomali, Rabbit: A Free Video Chat That Makes It Easy to Watch Netflix With Friends, Aug. 19, 2014, www.fastcompany.com, https://www.fastcompany.com/3034555/rabbit-a-free-video-chat-that-makes-it-easy-to-watch-netflix-with-friends.*

* cited by examiner

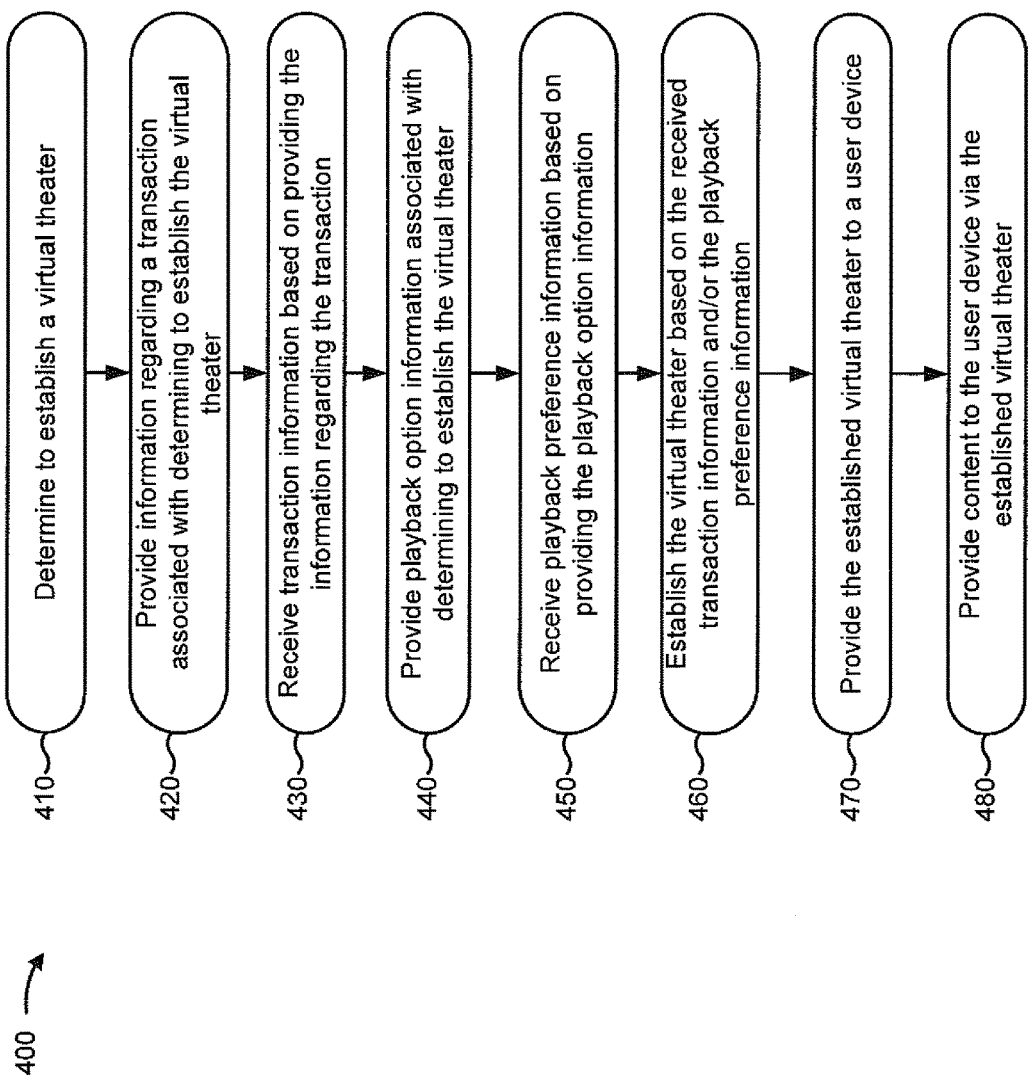

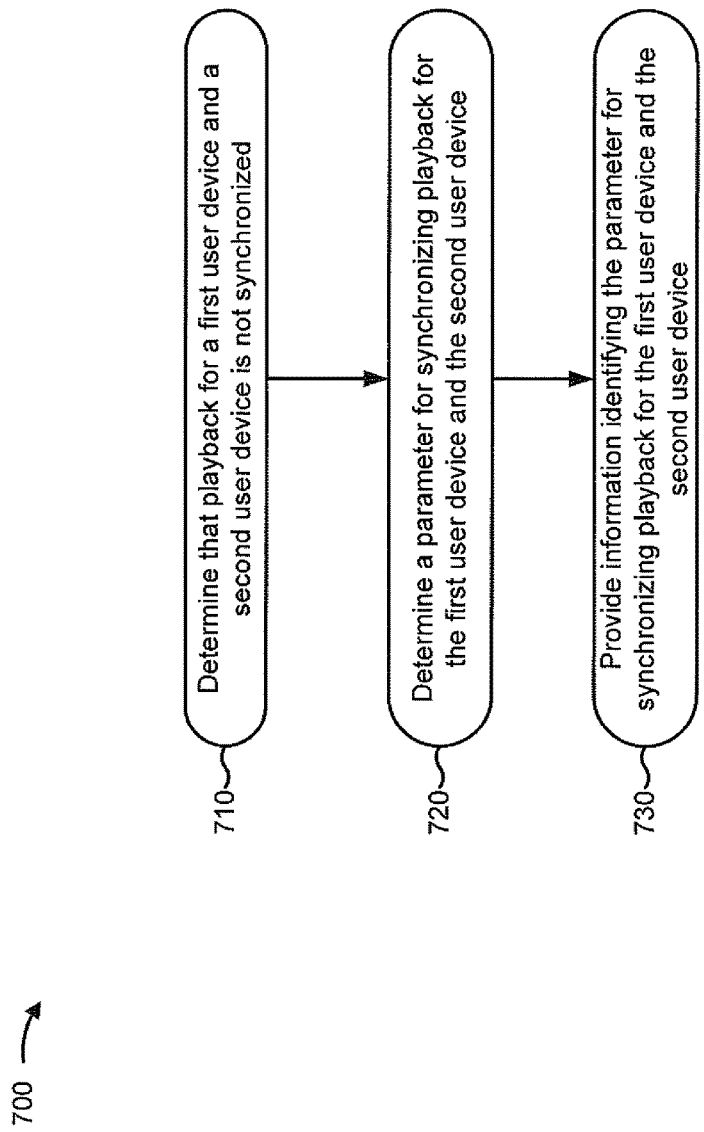

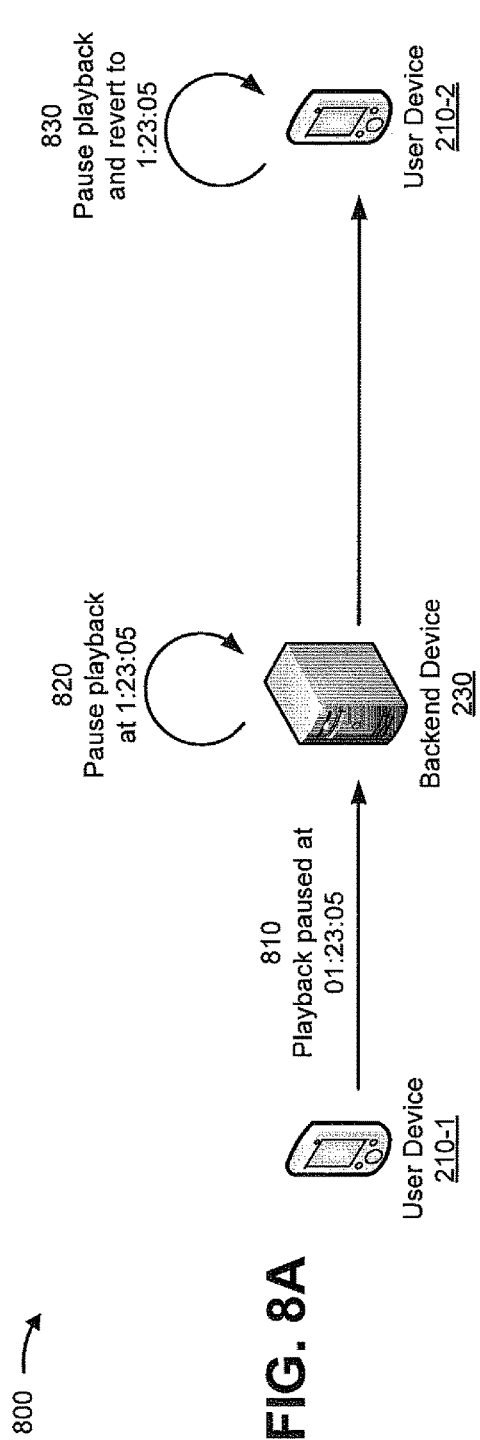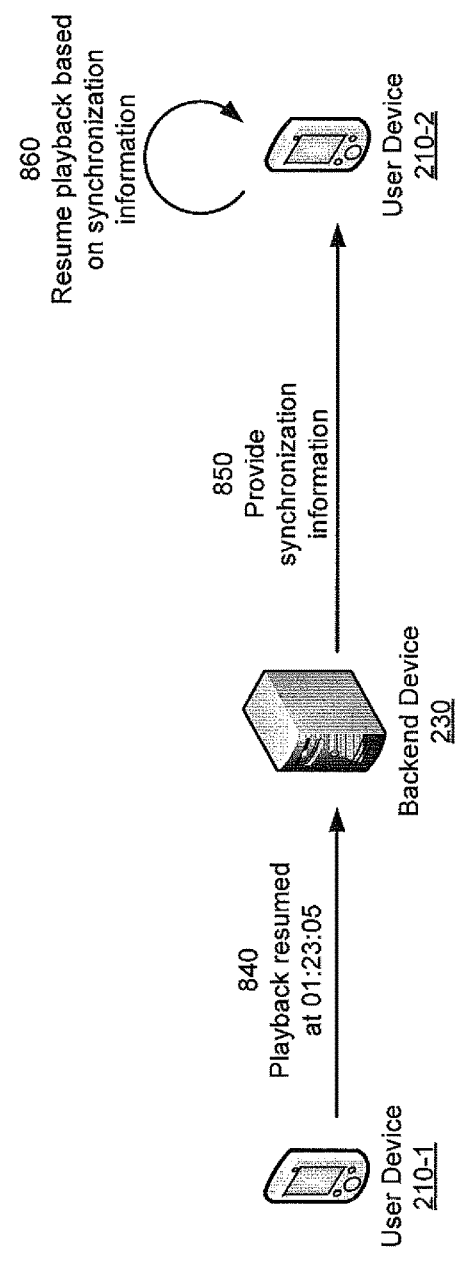

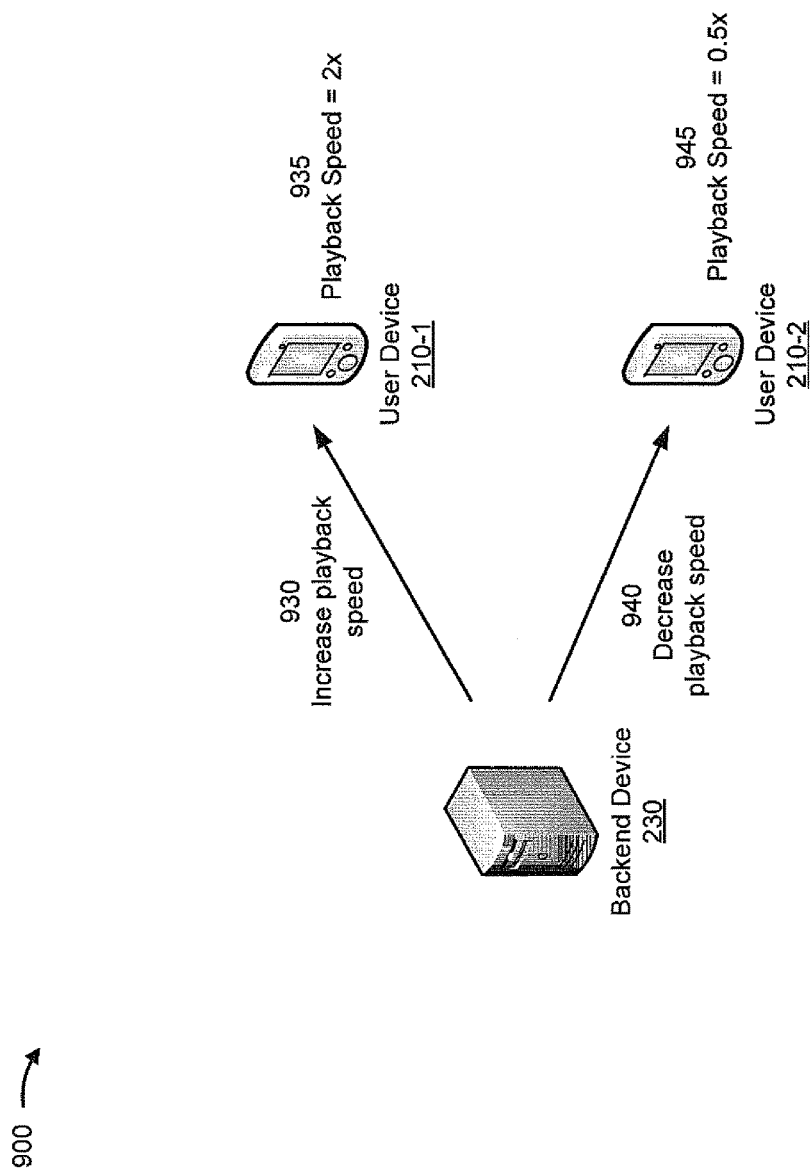

ESTABLISHMENT AND SYNCHRONIZATION OF A VIRTUAL THEATER BASED ON TRANSACTION INFORMATION AND PLAYBACK PREFERENCE INFORMATION

BACKGROUND

A user of a user device (e.g., a smart phone, a personal computer, etc.) may be provided streaming web content, such as video content (e.g., a movie, a television program, etc.), audio content (e.g., a song, an album, a podcast, an audiobook, etc.), or the like, from a content provider. The user may transact with the content provider to be provided the content.

BRIEF DESCRIPTION OF THE DRAWINGS

FIG. 4 is a flow chart of an example process for establishing a virtual theater;

FIG. 7 is a flow chart of an example process for synchronizing playback for a virtual theater;

FIGS. 8A and 8B are diagrams of an example implementation relating to the example process shown in FIG. 7;

FIGS. 9A-9D are diagrams of another example implementation relating to the example process shown in FIG. 7;

DETAILED DESCRIPTION OF PREFERRED EMBODIMENTS

The following detailed description of example implementations refers to the accompanying drawings. The same reference numbers in different drawings may identify the same or similar elements.

A content provider may provide, to a user, content, such as a movie, a television program, a radio program, an audiobook, or the like, to be viewed and/or listened to by the user using a user device. The content provider may provide an application with which to view and/or listen to the content on the user device. However, providing content to a user may limit the ability of multiple users to share a content viewing and/or listening experience. Implementations described herein may facilitate multi-user preference-based establishment of a virtual theater for synchronized content viewing by multiple user devices.

Figure 1:
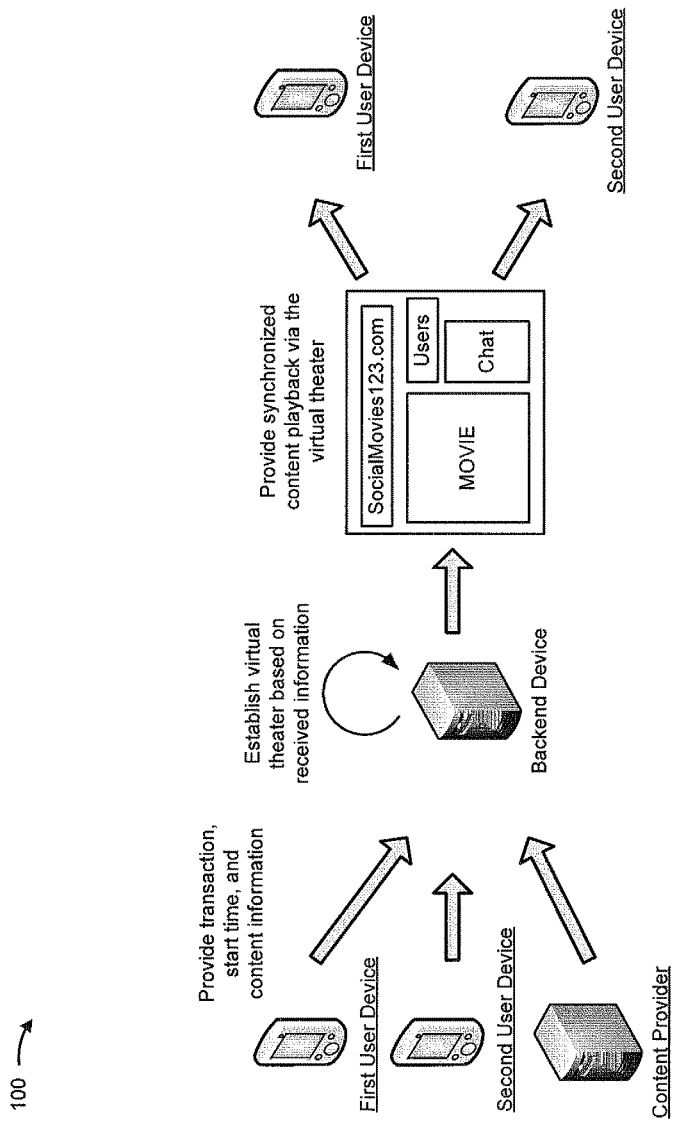
FIG. 1 is a diagram of an overview of an example implementation described herein.

FIG. 1 is a diagram of an overview of an example implementation 100 described herein. Example implementation 100 may include a first user device, a second user device, a content provider, and a backend device. As shown in FIG. 1, the first user device, the second user device, and/or the content provider may provide preference information to the backend device, such as content information, start time information, transaction information, or the like. Content information may refer to information associated with selecting media content to be provided via the virtual theater, such as audio content (e.g., a song, an album, a podcast, a concert, an audiobook, etc.), video content (e.g., a movie, a television program, etc.), or the like. Start time information may refer to information identifying a time at which the virtual theater is to be established and provided to the first user device and the second user device. Transaction information may include information associated with transacting to be authorized to view and/or listen to the media content, such as transaction type information (e.g., information indicating payment by a single user, split payment by multiple users, payment by a threshold quantity of users, etc.), payment information (e.g., billing information, account information, address information, etc.), or the like. For example, the content provider may offer a movie to be selected from a particular set of movies, and the first user device and the second user device may vote on which movie of the set of movies to watch. In another example, the preference information may be based on transaction information and/or playback option information provided by the backend device (e.g., provided to the first user device, the second user device, or the like).

The backend device may receive the preference information, and may establish a virtual theater for providing media content based on the preference information. For example, the backend device may determine a movie to be provided and a start time for providing the movie based on preference information received from the first user device and/or the second user device, and may transact with the first user device and the second user device. The backend device may provide the established virtual theater to the first user device and the second user device, and may provide media content via the established virtual theater.

In another example, the backend device may determine that media content, being provided via the established virtual theater, is not synchronized for the first user device and the second user device. In this case, the backend device may determine a parameter for synchronizing playback of the media content, and may provide information identifying the parameter to the first user device and/or the second user device. For example, the backend device may increase playback speed for the first user device and/or may decrease playback speed for the second user device.

In another example, the backend device may receive a request, from another user device, to join the established virtual theater being provided to first user device and/or second user device. In this case, the backend device may provide synchronization information, such as a timestamp associated with playback via the first user device and/or the second user device, a timestamp offset, or the like, for synchronizing playback for the other user device with the first user device and/or the second user device.

While systems and methods are described herein in terms of video and users viewing the video, the systems and methods may also be implemented in terms of audio and users listening to the audio. For example, a backend device may provide media content, such as a podcast, an audiobook, a concert performance, or the like, to a user device via the virtual theater, and the user device may provide the program for listening by a user.

Figure 2:
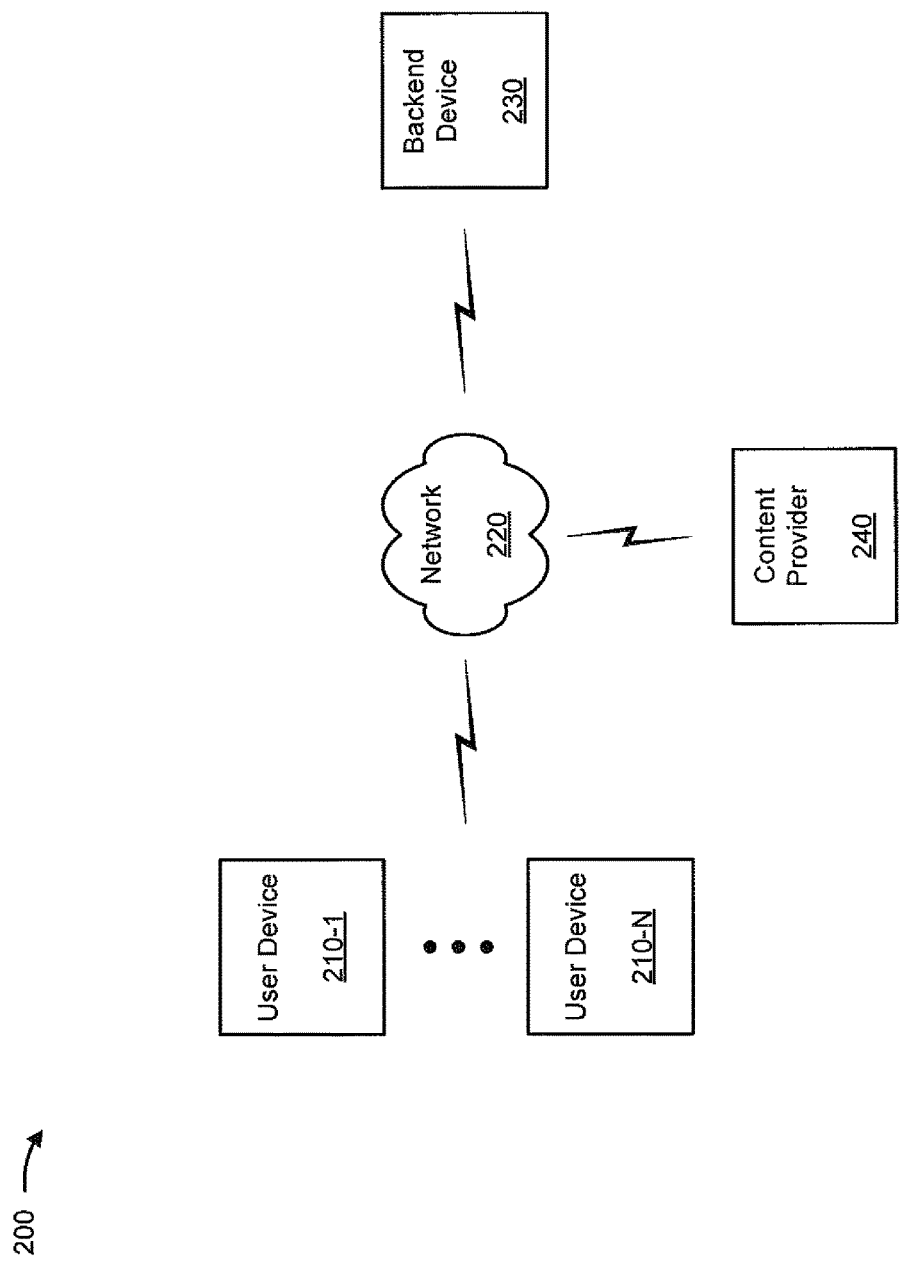
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 to 210-N (N≥1) (hereinafter referred to collectively as "user devices 210," and individually as "user device 210"), network 220, backend device 230, and content provider 240. Devices of environment 200 may interconnect via wired connections, wireless connections, or a combination of wired and wireless connections.

User device 210 may include one or more devices capable of receiving, generating, processing, storing, providing, and/ or interacting with a virtual theater. For example, user device 210 may include a mobile phone (e.g., a smart phone), a radiotelephone, a personal communications systems (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), a video game console, a set-top box, or a similar type of device. In some implementations, user device 210 may be provided a virtual theater by backend device 230 (e.g., via network 220). In some implementations, user device 210 may provide playback preference information, such as content selection information, start time selection information, or the like, to backend device 230. In some implementations, user device 210 may provide playback via a separate display device, and may provide one or more other virtual theater capabilities via user device 210, such as a chat capability, a playback control capability, or the like.

Network 220 may include one or more wired and/or wireless networks. For example, network 220 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In some implementations, backend device 230 may provide a virtual theater (e.g., that provides content, such as audio content, video content, or the like) to one or more user devices 210 via network 220.

Backend device 230 may include one or more devices capable of receiving, generating, processing, storing, monitoring, and/or providing information associated with a virtual theater. For example, backend device 230 may include a server capable of hosting the virtual theater, processing transactions associated with the virtual theater, and/or providing media content via the virtual theater. In some implementations, backend device 230 may monitor the virtual theater to detect a lack of synchronization for media content being provided via the virtual theater, and may provide information associated with re-synchronizing playback of the media content.

Content provider 240 may include one or more devices capable of receiving, generating, processing, storing, and/or providing media content associated with a virtual theater. For example, content provider 240 may include a server capable of hosting media content, and/or providing information associated with media content. In some implementations, content provider 240 may provide, to backend device 230 (e.g., via network 220), transaction information associated with authorizing media content to be provided for viewing and/or listening via a virtual theater.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while backend device 230 and content provider 240 are shown as separate devices, backend device 230 and content provider 240 may be implemented in a single device or in a single collection of devices. Additionally, one or more of the devices of environment 200 may perform one or more functions described as being performed by another one or more devices of environment 200.

Figure 3:
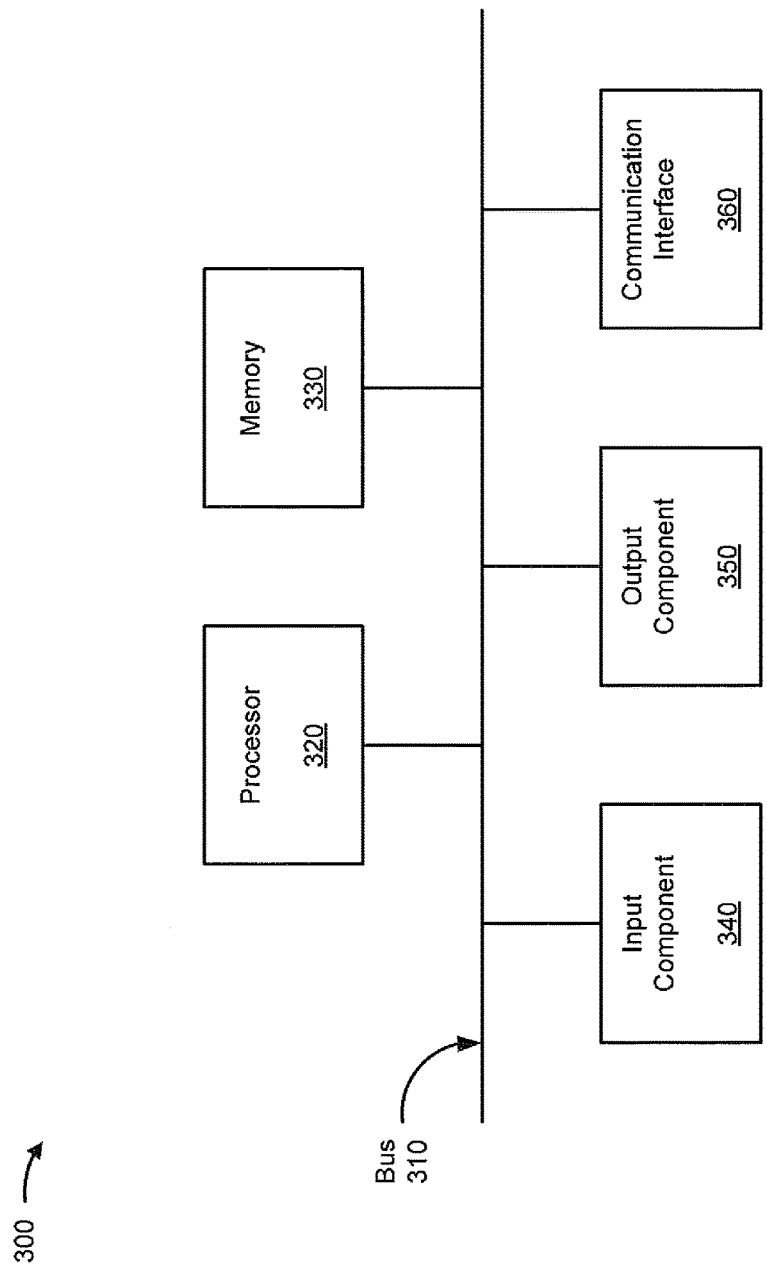
FIG. 3 is a diagram of example components of one or more devices of FIG. 2.

FIG. 3 is a diagram of example components of a device 300. Device 300 may correspond to user device 210, backend device 230, and/or content provider 240. In some implementations, each of user device 210, backend device 230, and/or content provider 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

FIG. 4 is a flow chart of an example process for establishing a virtual theater. In some implementations, one or more process blocks of FIG. 4 may be performed by backend device 230. Additionally, or alternatively, one or more process blocks of FIG. 4 may be performed by another device or a group of devices separate from or including backend device 230, such as user device 210 and/or content provider 240.

As shown in FIG. 4, process 400 may include determining to establish a virtual theater (block 410). For example, backend device 230 may determine to establish the virtual theater. A virtual theater may refer to a media content providing platform that may include a social interaction component (e.g., a chat capability, a commenting capability, a trivia capability, a social recommendation capability, etc.), a playback control component (e.g., a component for pausing playback, resuming playback, etc.), or the like. For example, the virtual theater may provide a movie to a set of user devices 210, and users utilizing the set of user devices 210 may access a chat capability to communicate while being provided the movie.

Backend device 230 may determine to establish the virtual theater based on a request, in some implementations. For example, backend device 230 may receive a request to establish the virtual theater from user device 210. Additionally, or alternatively, backend device 230 may receive the request to establish the virtual theater from content provider 240. In this case, backend device 230 may determine a particular user device 210 to be provided the virtual theater.

Backend device 230 may receive information identifying one or more user devices 210 to be invited to the virtual theater, in some implementations. For example, first user device 210 may request to establish a virtual theater, and may provide information identifying a set of other user devices 210 with which the virtual theater is to be shared. In this case, backend device 230 may invite the set of other user devices 210 to share the virtual theater (e.g., via an email, a social network service post, a short message service (SMS) text message, a multimedia messaging service (MMS) text message, etc.).

As further shown in FIG. 4, process 400 may include providing information regarding a transaction associated with determining to establish the virtual theater (block 420). For example, backend device 230 may provide the information regarding the transaction to user device 210. Additionally, or alternatively, backend device 230 may provide the information regarding the transaction to content provider 240. In some implementations, backend device 230 may provide the information regarding the transaction based on receiving a request to establish the virtual theater from user device 210, content provider 240, or the like. In some implementations, backend device 230 may provide first information regarding the transaction to first user device 210 and second information regarding the transaction to second user device 210.

Backend device 230 may provide information identifying a transaction when providing the information regarding the transaction, in some implementations. For example, backend device 230 may provide information to user device 210 indicating that a transaction is to be completed with user device 210. In this case, backend device 230 may provide information associated with providing media content via the virtual theater, such as cost information, billing information, or the like, to user device 210, and user device 210 may transact to establish the virtual theater based on the provided information. Additionally, or alternatively, backend device 230 may provide information identifying the transaction to a set of user devices 210, to content provider 240, or the like, and may transact to establish the virtual theater therewith.

Backend device 230 may provide information associated with a payment when providing information regarding the transaction, in some implementations. For example, backend device 230 may provide information to user device 210 indicating a content sponsorship transaction. In this case, content provider 240 may transact to sponsor content for user device 210 to access. Additionally or alternatively, backend device 230 may provide information indicating that user device 210 may transact to sponsor content for other user devices 210. In some implementations, backend device 230 may provide information to user device 210 indicating that a particular price may be paid by user device 210. Additionally, or alternatively, backend device 230 may provide information indicating that a payment may be split amongst a set of user devices 210. Additionally, or alternatively, backend device 230 may provide information indicating that a payment may be made when a threshold quantity of user devices 210 request to join the virtual theater. Additionally, or alternatively, backend device 230 may provide information indicating that an amount of a payment may be set based on the quantity of user devices 210 that request to join the virtual theater.

As further shown in FIG. 4, process 400 may include receiving transaction information based on providing the information regarding the transaction (block 430). For example, backend device 230 may receive transaction information from user device 210 based on providing the information regarding the transaction to user device 210. In some implementations, backend device 230 may receive information selecting a transaction type, such as a transaction splitting payment amongst a set of user devices 210, a transaction assessing payment to a particular user device 210, or the like.

In some implementations, backend device 230 may receive transaction information identifying billing information for user device 210, such as an account identifier, a credit card number, a billing address, or the like. In some implementations, backend device 230 may receive transaction information providing information identifying a quantity of user devices 210. For example, when backend device 230 indicates that a particular payment for media content is to be completed when a threshold quantity of user devices 210 determine to purchase the media content, backend device 230 may receive information associated with determining that the threshold has been satisfied.

As further shown in FIG. 4, process 400 may include providing playback option information associated with determining to establish the virtual theater (block 440). For example, backend device 230 may provide playback option information to user device 210, such as information associated with a start time option (e.g., a set of start times at which content may be provided), a content selection option (e.g., a set of programs that may be selected to be provided), a determination option (e.g., information associated with selecting from the set of start times and/or the set of programs, such as voting information indicating that a majority of votes may be necessary for a selection, selection priority information indicating that a particular user device 210 is to provide a selection for multiple other user devices 210, or the like), etc.

As further shown in FIG. 4, process 400 may include receiving playback preference information based on providing the playback option information (block 450). For example, backend device 230 may receive playback preference information from user device 210. In some implementations, backend device 230 may receive a playback preference identifying a selected playback option from a set of playback options. For example, when backend device 230 provides a set of playback options (e.g., a set of playback start time options, a set of content selection options, etc.) to user device 210, content provider 240, etc., backend device 230 may receive playback preference information indicating a selected option from the set of playback options.

In some implementations, backend device 230 may determine a playback setting by aggregating playback preference information. For example, backend device 230 may receive a first playback preference from a first user device 210 and a second playback preference from a second user device 210. In this case, backend device 230 may determine the playback setting based on the first playback preference and the second playback preference. Additionally, or alternatively, backend device 230 may determine the playback setting based on determining that a quantity of playback option selections satisfies a threshold. For example, backend device 230 may determine that a particular playback option is to be selected as the playback setting when a threshold quantity of user devices 210 indicate the particular playback option when providing playback preference information. Additionally, or alternatively, backend device 230 may determine that a particular playback option is to be selected as the playback setting based on a majority of user devices 210 indicating the particular playback option, a relative majority of user devices 210 indicating the particular playback option, or the like, when providing playback preference information.

As further shown in FIG. 4, process 400 may include establishing the virtual theater based on the received transaction information and/or the playback preference information (block 460). For example, backend device 230 may establish the virtual theater for user device 210 based on receiving transaction information and/or playback preference information from user device 210. Additionally, or alternatively, backend device 230 may establish the virtual theater based on receiving the transaction information and/or the playback preference information from content provider 240.

In some implementations, backend device 230 may configure the virtual theater for establishment. For example, backend device 230 may determine one or more components to be provided via the virtual theater, such as a media playback component (e.g., a video playback component, an audio playback component, etc.), a social interaction component, or the like.

In some implementations, backend device 230 may receive media content from content provider 240 when establishing the virtual theater. For example, backend device 230 may provide an indication of the selected media content, to content provider 240, based on receiving the playback preference information, and may receive the selected media content from content provider 240.

In some implementations, backend device 230 may provide information, indicating that the virtual theater is being established, to user device 210. For example, when backend device 230 establishes the virtual theater based on a threshold quantity of user devices 210 providing payment, backend device 230 may provide an indication to the user devices 210 that the threshold has been satisfied. Additionally, or alternatively, backend device 230 may provide information, to user device 210, that identifies content provider 240 from which media content is to be provided.

As further shown in FIG. 4, process 400 may include providing the established virtual theater to a user device (block 470). For example, backend device 230 may provide the virtual theater to user device 210. In some implementations, backend device 230 may select a transmission mode, such as a unicast transmission, a broadcast transmission, a multicast transmission, or the like, for providing the virtual theater. For example, based on determining that a particular quantity of user devices 210 are to be provided the virtual theater, backend device 210 may select a particular transmission mode. In some implementations, backend device 230 may provide a link to a particular web address associated with the virtual theater (e.g., a web address associated with content server 240). For example, backend device 230 may provide the link (e.g., via an email, a social network service posting, an SMS message, an MMS message, etc.) to user devices 210 that have transacted to be provided the virtual theater. In some implementations, backend device 230 may provide the link and/or a reminder to user device 210 a particular amount of time before the media content is scheduled to be provided via the virtual theater. Additionally, or alternatively, backend device 230 may provide the link to a sponsor (e.g., user device 210, content provider 240, or the like), and the sponsor may disseminate the link to one or more user devices 210.

As further shown in FIG. 4, process 400 may include providing content to the user device via the established virtual theater (block 480). For example, backend device 230 may provide content via the virtual theater to user device 210. In some implementations, backend device 230 may provide an indication that content is being provided via the virtual theater. For example, when backend device 230 receives playback preference information indicating a particular time at which to provide content, backend device 230 may provide an indication of the particular time to user devices 210 that are to be provided the content via the virtual theater.

In some implementations, backend device 230 may facilitate social interaction when providing the content to user device 210 via the virtual theater. For example, backend device 230 may provide a chat function between a first user device 210 being provided the virtual theater and a second user device 210 being provided the virtual theater. Additionally, or alternatively, backend device 230 may facilitate another social interaction, such as a voice chat, a video chat, or the like. Additionally, or alternatively, backend device 230 may utilize a social network service to facilitate the chat function. In some implementations, backend device 230 may receive information (e.g., from user device 210, content provider 240, or the like) associated with determining the social interaction that is to be provided via the virtual theater. For example, content provider 240 may indicate that backend device 230 is to facilitate voice chat between user devices 210 that are being provided the virtual theater.

In this way, a backend device may provide media content via a virtual theater to one or more user devices based on transaction information and playback preference information.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
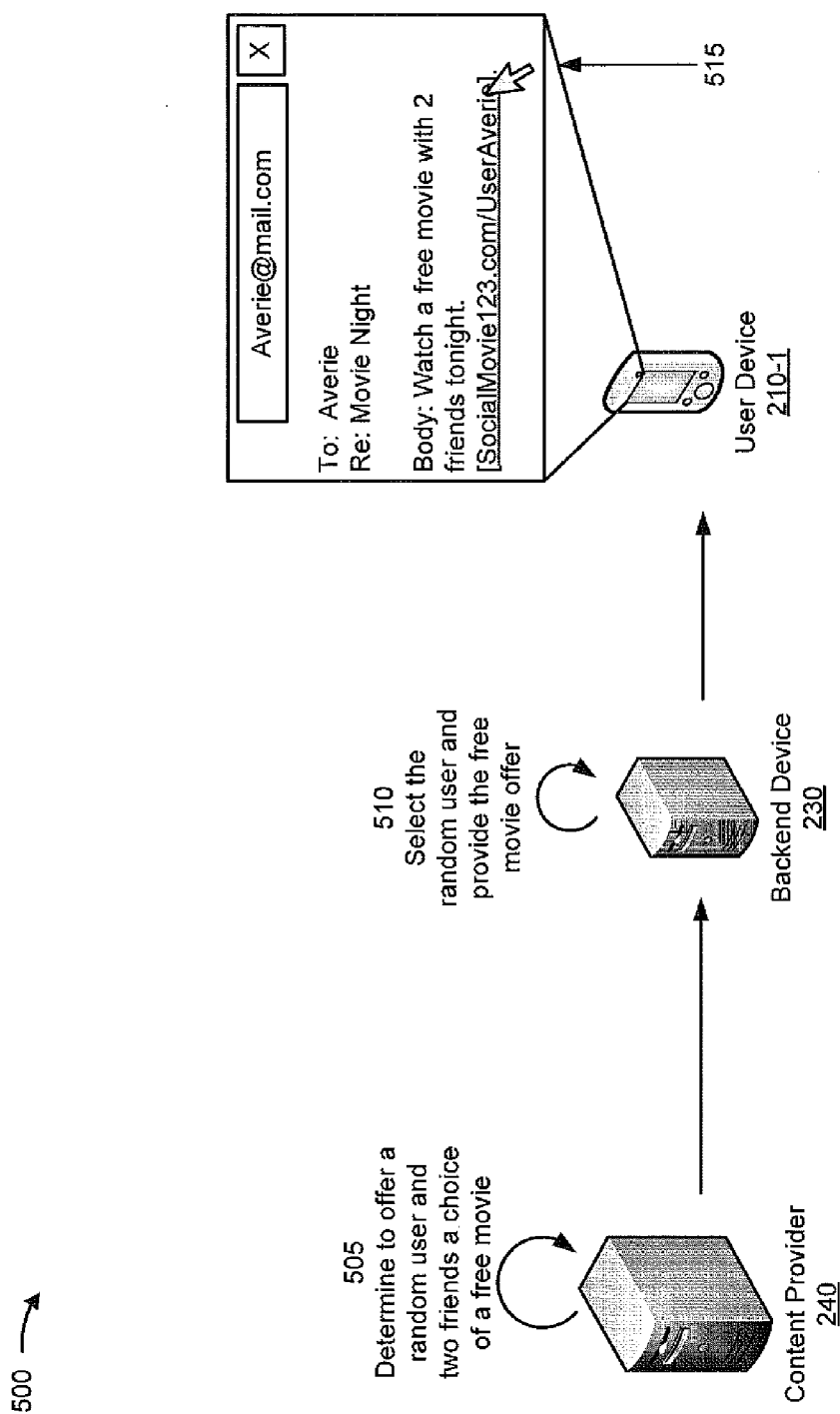
FIGS. 5A-5G are diagrams of an example implementation relating to the example process shown in FIG. 4.

FIGS. 5A-5G are diagrams of an example implementation 500 relating to process 400 shown in FIG. 4. As shown in FIG. 5A, example implementation 500 includes user device 210-1, backend device 230, and content provider 240. Assume that a user (e.g., "Averie") is associated with user device 210-1. As shown by reference number 505, content provider 240 determines to sponsor a free movie for viewing via a virtual theater, and provides information associated with the free movie sponsorship to backend device 230. The provided information indicates that content provider 240 is to offer a random user a choice of a free movie. Backend device 230 receives the information from content provider 240 and, as shown by reference number 510, selects the random user (e.g., user Averie), and provides an email identifying the offer to user device 210-1. As shown by reference number 515, based on interaction with a link, user Averie accepts the offer for the free movie. Assume that the offer includes providing the free movie to user Averie and to two other users that user Averie may select.

Figure 5B:
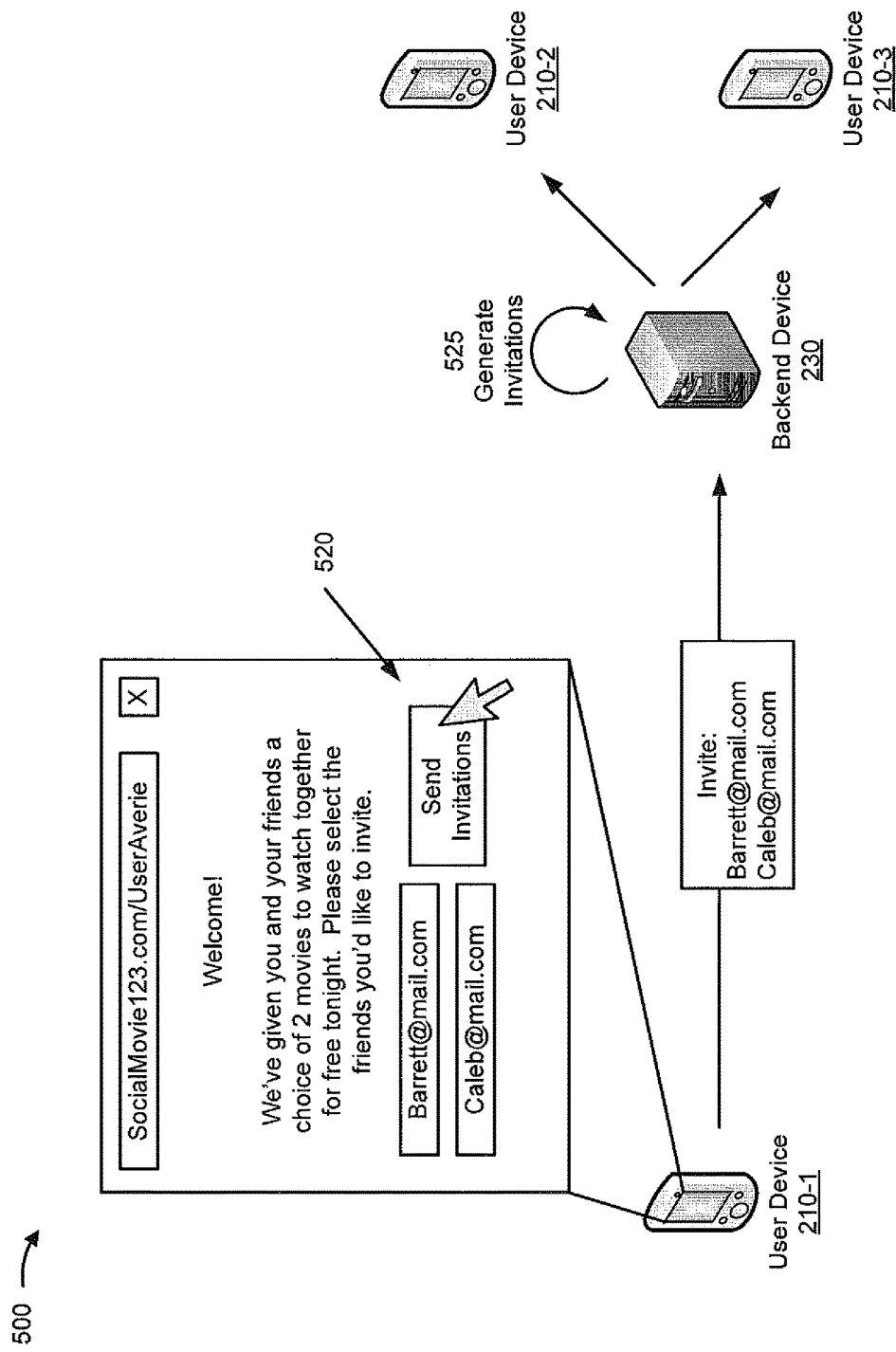

As shown in FIG. 5B, and by reference number 520, based on user interaction with a button, user device 210-1 provides information to backend device 230 identifying the two other users (e.g., "Barrett" and "Caleb") to be provided with the free movie via a virtual theater. Assume that user Barrett is associated with user device 210-2 and user Caleb is associated with user device 210-3. As shown by reference number 525, backend device 230 generates invitations for user Barrett and user Caleb, and provides the invitations via email to user device 210-2 and user device 210-3.

Figure 5C:
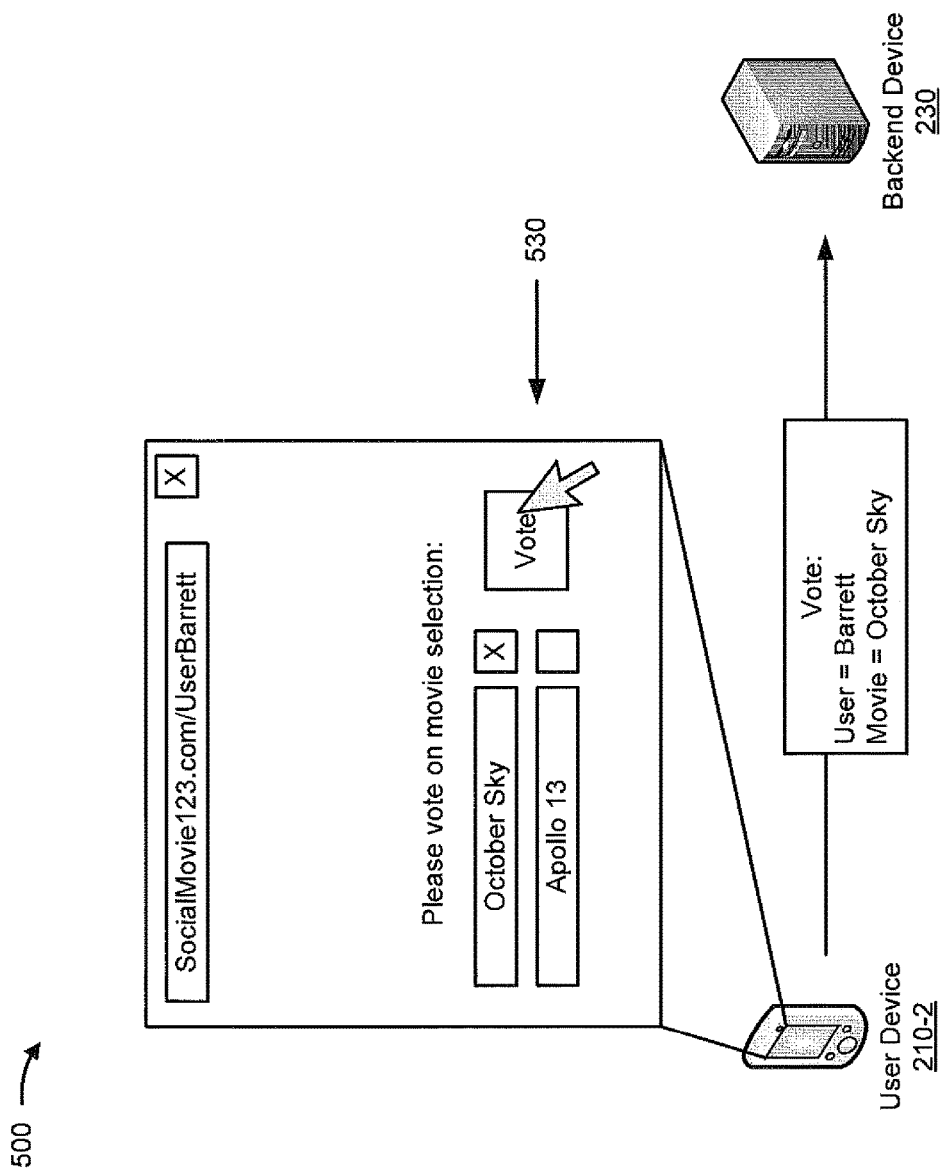
Figure 5D:
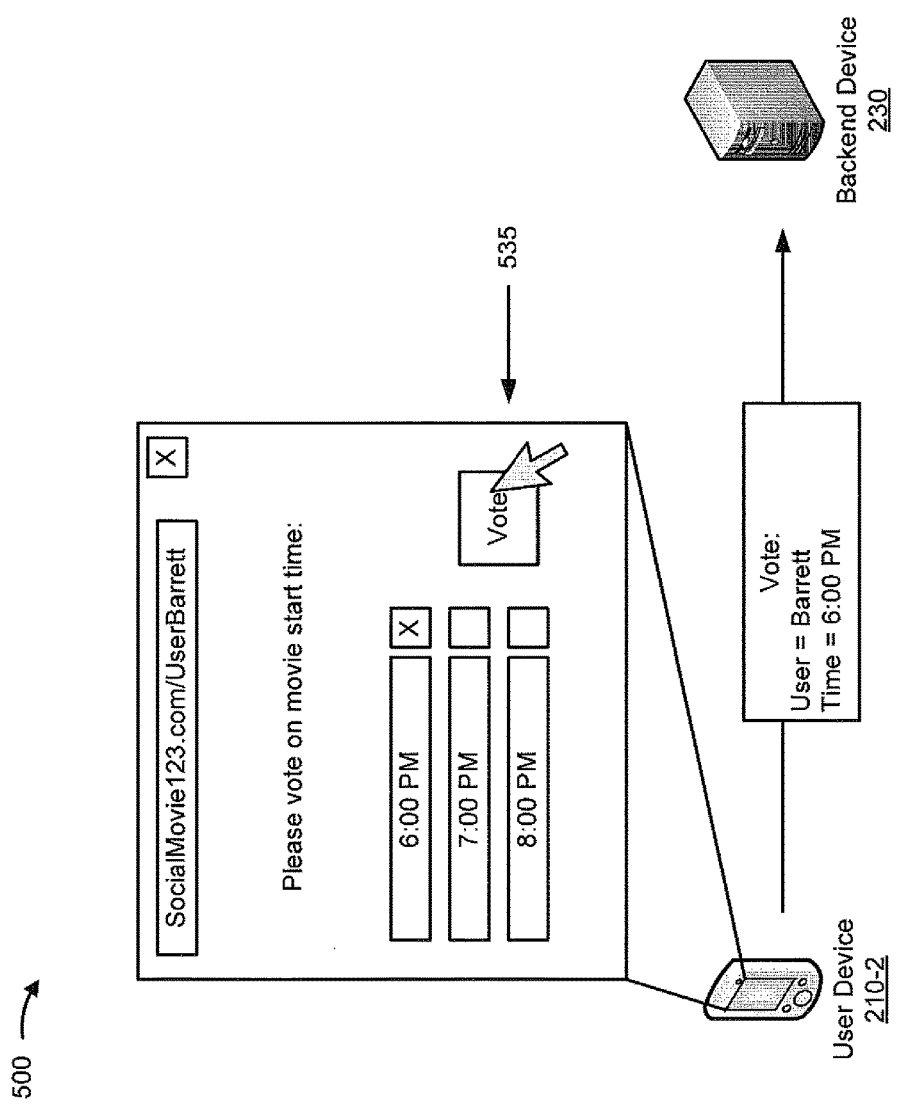

As shown in FIG. 5C, backend device 230 provides (e.g., via the invitation) a playback option to choose the free movie as either "October Sky" or "Apollo 13." As shown by reference number 530, user Barrett selects "October Sky" by selecting a check box, and based on user interaction with a button, provides playback preference information indicating the selection to backend device 230. Assume that backend device 230 also receives playback preference information associated with selecting the free movie from user Averie and user Caleb. As shown in FIG. 5D, the invitation provides a playback option to choose either "6:00 PM," "7:00 PM," or "8:00 PM" as a start time for providing the movie via the virtual theater. As shown by reference number 535, user Barrett selects "6:00 PM" as the start time, and based on user interaction with a button, provides playback preference information indicating the selection to backend device 230. Assume that backend device 230 also receives playback preference information associated with selecting a start time from user Averie and user Caleb.

Figure 5E:
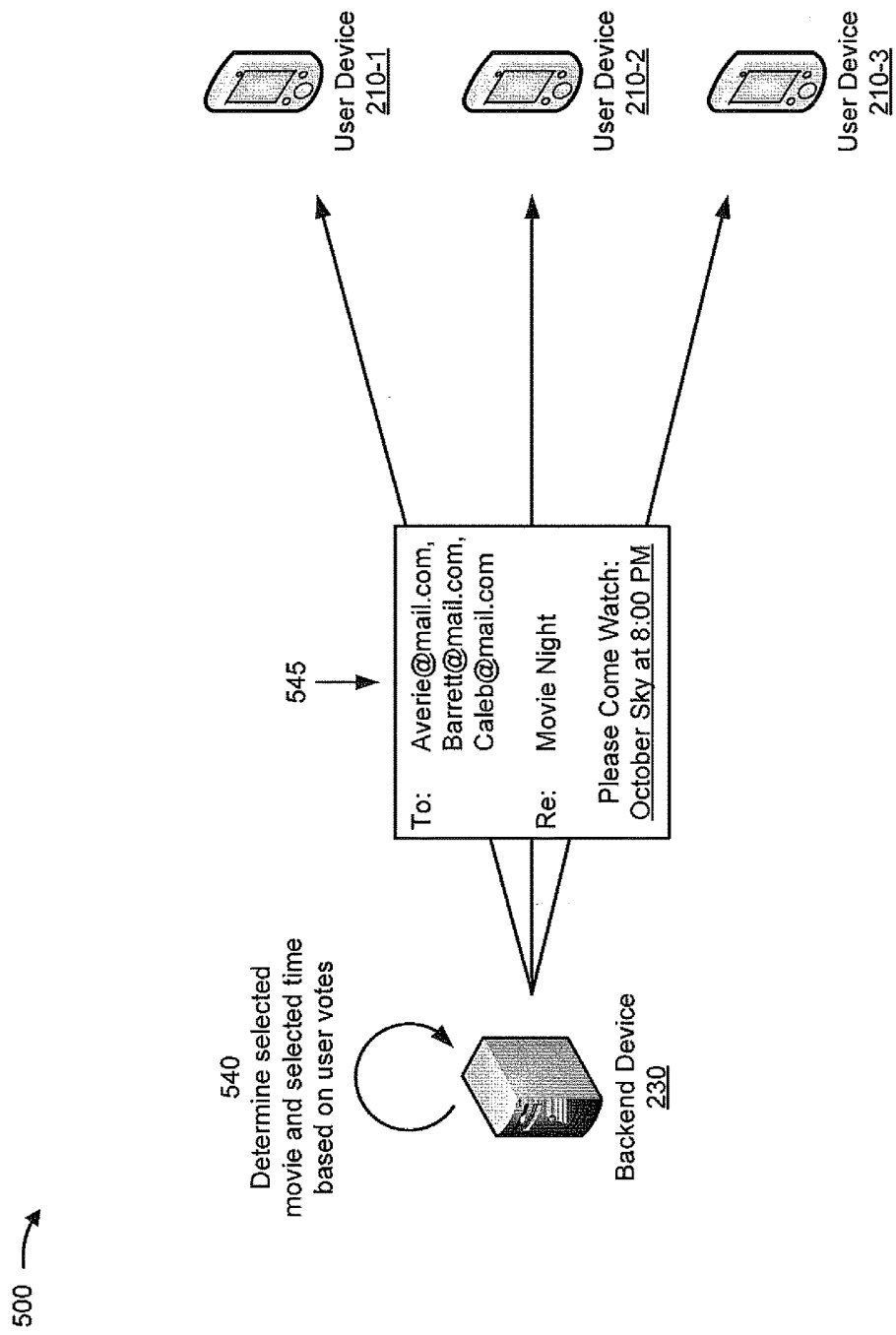

As shown in FIG. 5E, and by reference number 540, backend device 230 selects the free movie to be provided and a start time based on the received playback preference information. As shown by reference number 545, backend device 230 provides an indication of the selected movie (e.g., "October Sky") and the selected start time (e.g., "8:00 PM") via email to user device 210-1, user device 210-2, and user device 210-3.

Figure 5F:
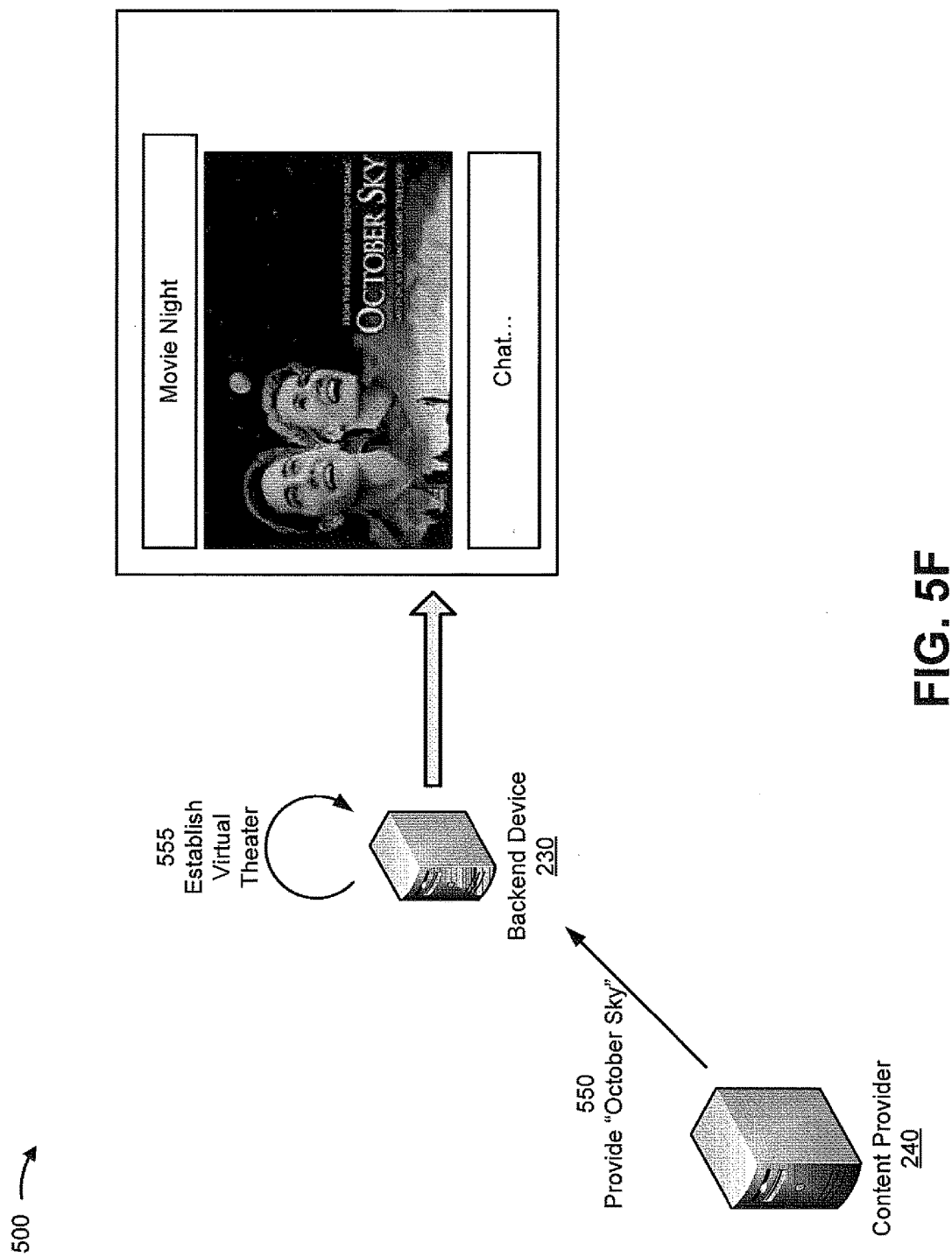
Figure 5G:
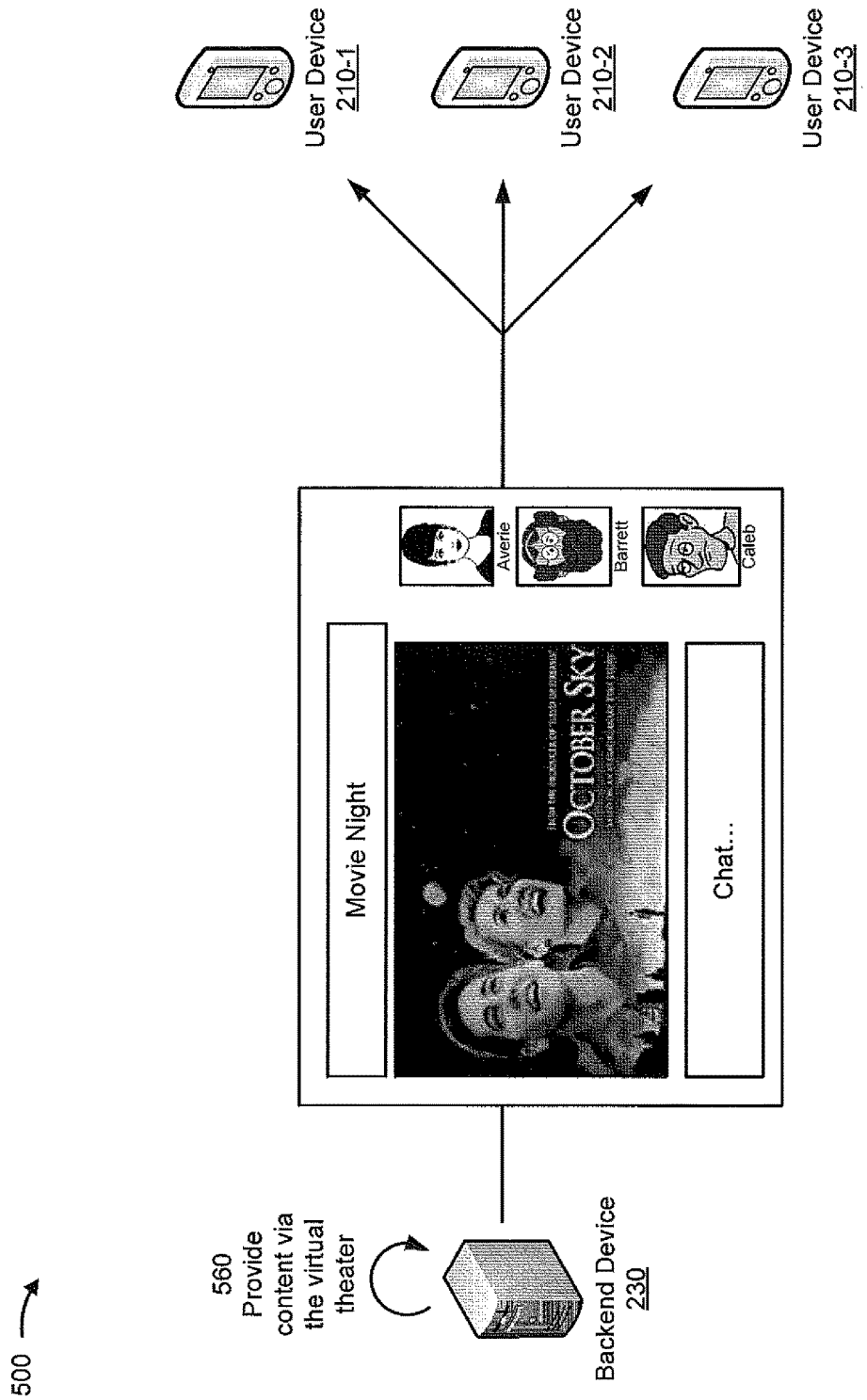

As shown in FIG. 5F, and by reference number 550, content provider 240 provides "October Sky" to backend device 230. As shown by reference number 555, backend device 230 receives "October Sky," and establishes the virtual theater to provide "October Sky" and a chat capability. As shown in FIG. 5G, and by reference number 560, backend device 230 determines to provide "October Sky" via the virtual theater. User device 210-1, user device 210-2, and user device 210-3 receive the media content (e.g., via a multicast transmission, via a unicast transmission, etc.), and may display the media content for viewing.

As indicated above, FIGS. 5A-5G are provided merely as an example. Other examples are possible and may differ from what was described with regard to FIGS. 5A-5G.

Figure 6A:
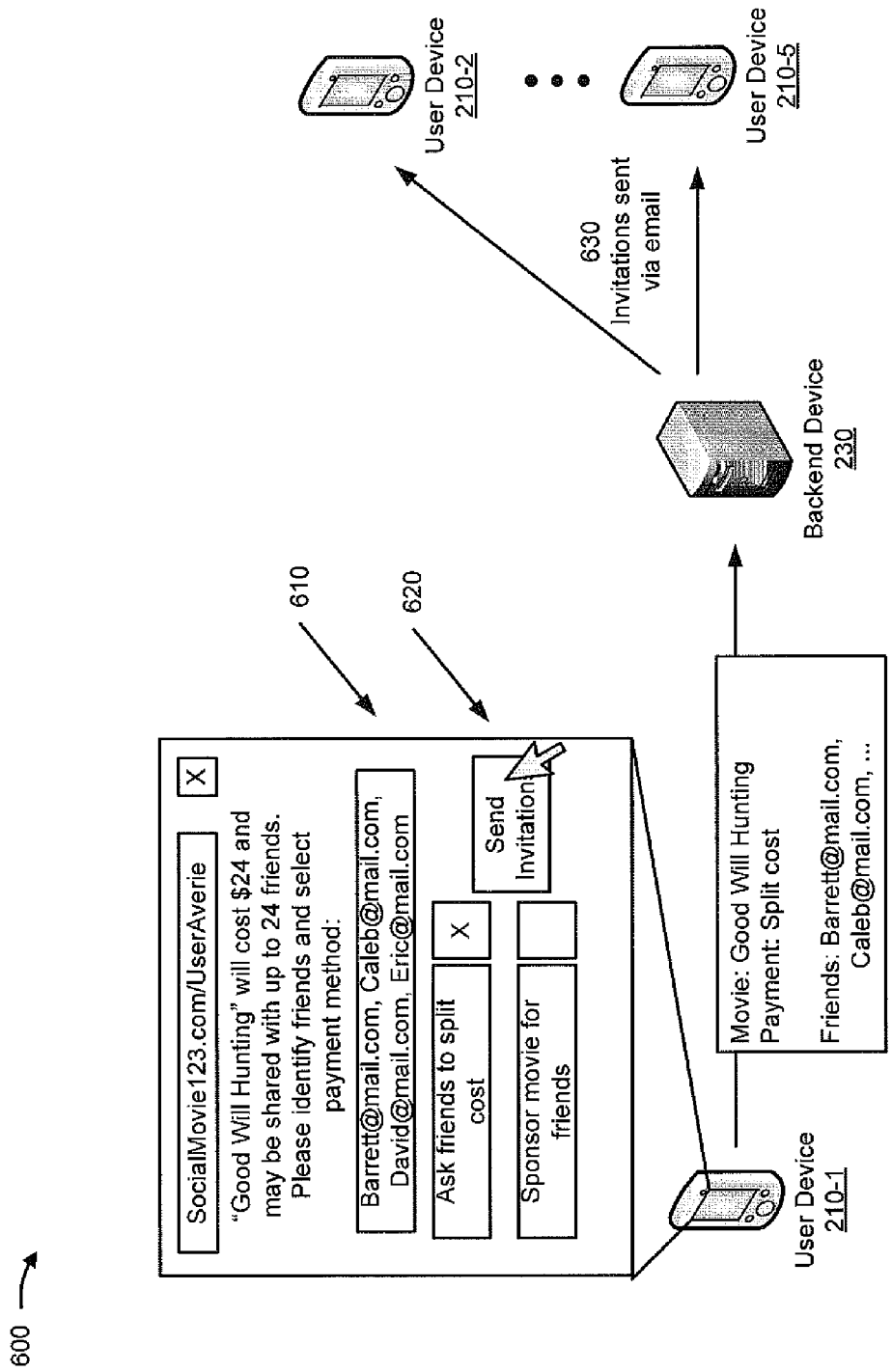
FIGS. 6A-6C are diagrams of another example implementation relating to the example process shown in FIG. 4.
Figure 6B:
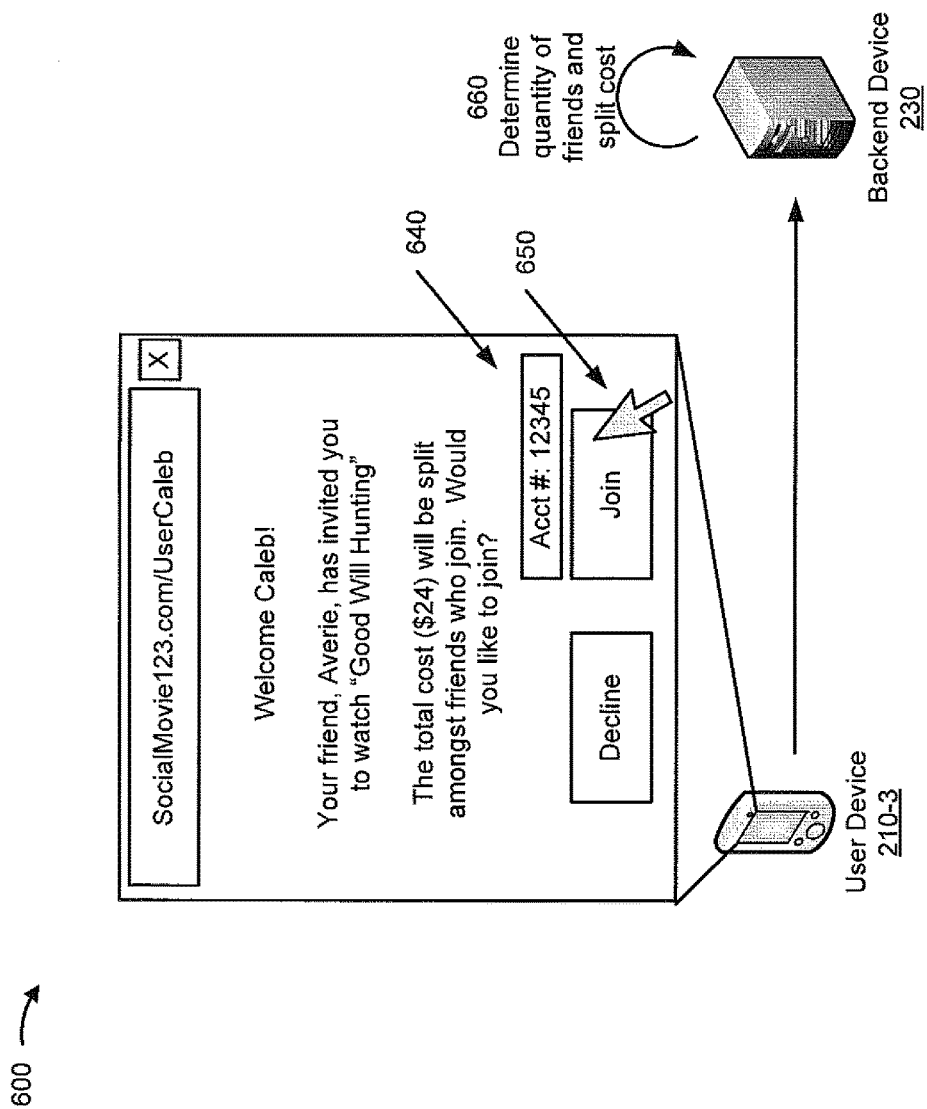
Figure 6C:
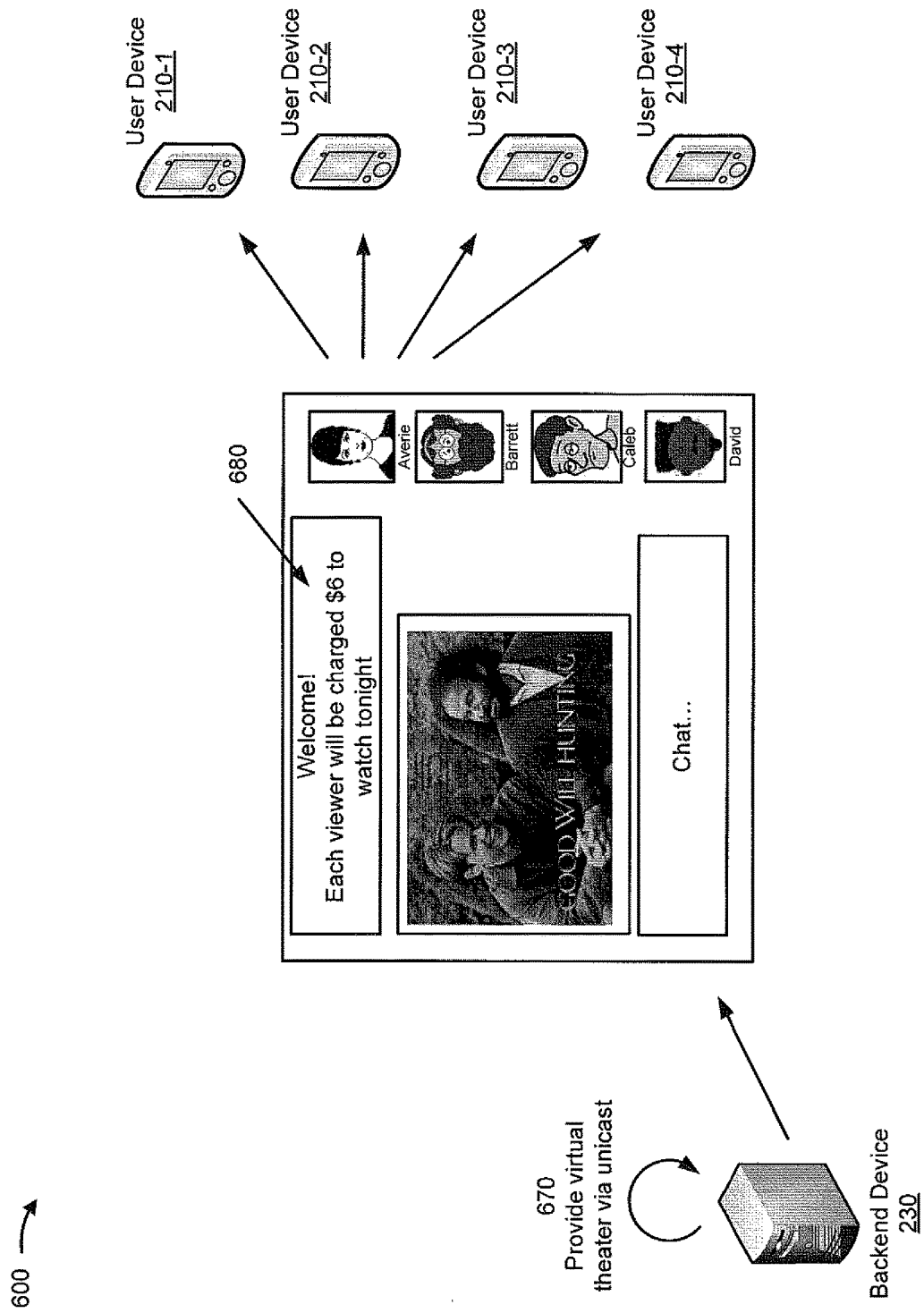

FIGS. 6A-6C are diagrams of an example implementation 600 relating to process 400 shown in FIG. 4. As shown in FIG. 6A, example implementation 600 includes a set of user devices 210-1 to 210-5 and backend device 230. Assume that user device 210-1 is associated with a first user (e.g., "Averie"), user device 210-2 is associated with a second user (e.g., "Barrett"), user device 210-3 is associated with a third user (e.g., "Caleb"), user device 210-4 is associated with a fourth user (e.g., "David"), and user device 210-5 is associated with a fifth user (e.g., "Eric").

As further shown in FIG. 6A, user device 210-1 accesses a web page associated with backend device 230 (e.g., "SocialMovie123.com/UserAverie"), and selects a particular movie to be provided via a virtual theater (e.g., "Good Will Hunting"). User Averie is provided with information regarding a transaction from backend device 230. The information regarding the transaction identifies a transaction cost associated with the movie selected by user Averie (e.g., "$24"), a quantity of other users who may access the virtual theater associated with the transaction (e.g., "24"), and a set of transaction types (e.g., "Ask friends to split cost" and "Sponsor movie for friends").

As further shown in FIG. 6A, and by reference number 610, user Averie identifies a set of email addresses associated with a set of other users to be invited to view the virtual theater (e.g., "Barrett@mail.com, Caleb@mail.com, David@mail.com, Eric@mail.com"). As shown by reference number 620, user Averie identifies the transaction type to be used (e.g., "Ask friends to split cost") by interacting with a check box, and based on an interaction with a button, user device 210-1 provides, to backend device 230, information identifying the selected movie, the transaction type, and the set of friends to be invited. As shown by reference number 630, backend device 230 provides invitations to the set of other users via email.

As shown in FIG. 6B, user Caleb receives the invitation from backend device 230 via user device 210-3. As shown by reference number 640, user Caleb provides transaction information (e.g., information identifying an account number). As shown by reference number 650, based on an interaction with a button, user device 210-3 indicates that user Caleb requests to be provided the virtual theater, and provides the transaction information to backend device 230. Assume that backend device 230 also receives a request to be provided the virtual theater from user device 210-1, user device 210-2, and user device 210-4. As shown by reference number 660, backend device 230 determines the quantity of users who have requested to be provided with the virtual theater (e.g., 4) and splits the cost of providing the virtual theater between the users. Assume that backend device 230 receives playback preference information, from user devices 210-1 to 210-4, selecting a particular start time.

As shown in FIG. 6C, and by reference number 670, backend device 230 provides the virtual theater to user devices 210-1 to 210-4 at the particular start time. As shown by reference number 680, backend device 230 provides an indication, via the virtual theater, of a cost charged to each user of the virtual theater (e.g., "Each viewer will be charged $6 to watch tonight").

As indicated above, FIGS. 6A-6C are provided merely as an example. Other examples are possible and may differ from what was described with regard to FIGS. 6A-6C.

FIG. 7 is a flow chart of an example process for synchronizing playback for a virtual theater. In some implementations, one or more process blocks of FIG. 7 may be performed by backend device 230. Additionally or alternatively, one or more process blocks of FIG. 7 may be performed by another device or a group of devices separate from or including backend device 230, such as user device 210 and/or content provider 240.

As shown in FIG. 7, process 700 may include determining that playback for a first user device and a second user device is not synchronized (block 710). For example, backend device 230 may determine that content, being provided to first user device 210 and second user device 210 via a virtual theater, is not synchronized. In some implementations, backend device 230 may receive information associated with determining a lack of synchronization from first user device 210 and second user device 210. For example, first user device 210 and second user device 210 may provide indications of the playback positions of content being provided via the virtual theater. In this case, backend device 230 may compare a first playback position indicator received from first user device 210 with a second playback position indicator received from second user device 210 to determine that content is not synchronized.

Backend device 230 may determine that content being provided is not synchronized based on determining that a threshold de-synchronization has been satisfied, in some implementations. For example, backend device 230 may compare a first playback position associated with first user device 210 to a second playback position associated with second user device 210. In this case, backend device 230 may determine that the difference between the first playback position and the second playback position satisfies a threshold, and may determine that first user device 210 and second user device 210 are not synchronized based on the threshold being satisfied.

Backend device 230 may determine that content being provided to first user device 210 is not synchronized with second user device 210 based on receiving an indication of a playback adjustment associated with first user device 210. For example, when first user device 210 adjusts playback (e.g., by stopping playback, by rewinding playback, by fast-forwarding playback, by pausing playback, by resuming playback, etc.), backend device 230 may determine that second user device 210 is no longer synchronized with first user device 210. In some implementations, backend device 230 may determine the playback position for a particular user device 210 based on a quantity of time elapsing. For example, backend device 230 may determine a first playback position for first user device 210 and second user device 210, and, when a threshold quantity of time has been satisfied, determine another playback position for first user device 210 and second user device 210.

As further shown in FIG. 7, process 700 may include determining a parameter for synchronizing playback for the first user device and the second user device (block 720). For example, backend device 230 may determine an adjustment to a parameter for synchronizing content for first user device 210 and second user device 210. In some implementations, backend device 230 may determine a playback position parameter to be adjusted. For example, backend device 230 may determine that a playback position associated with first user device 210 is to be adjusted to match a playback position associated with second user device 210. In some implementations, backend device 230 may determine a playback offset associated with synchronizing playback. For example, backend device 230 may determine a playback position associated with second user device 210 and a playback offset based on server latency in determining the playback position.

In some implementations, backend device 230 may determine a playback speed parameter to be adjusted. For example, when backend device 230 determines that a first playback position associated with first user device 210 precedes a second playback position associated with second user device 210, backend device 230 may determine to increase a first playback speed parameter associated with first user device 210 and/or decrease a second playback speed parameter associated with second user device 210. In some implementations, a quantity of change to the first playback speed parameter and/or the second playback speed parameter may be determined based on the difference between the first playback position and the second playback position.

Backend device 230 may determine a parameter for a playback adjustment for first user device 210, in some implementations. For example, when backend device 230 determines that second user device 210 has paused playback for the virtual theater associated with second user device 210, backend device 230 may adjust a parameter to pause playback for the virtual theater associated with first user device 210.

As further shown in FIG. 7, process 700 may include providing information identifying the parameter for synchronizing playback for the first user device and the second user device (block 730). For example, backend device 230 may provide information identifying the parameter for synchronizing playback for first user device 210 and second user device 210. In some implementations, backend device 230 may provide the information by utilizing a function of the virtual theater. For example, backend device 230 may utilize an application programming interface call, such as a "SetPlaybackLocation" call (e.g., a command setting a playback location of user device 210 to a particular playback location), a "SetPlaybackSpeed" call (e.g., a command setting a playback speed of user device 210 to a particular playback speed), or the like. In some implementations, backend device 230 may provide information to first user device 210 indicating the parameter adjustment for synchronization with second user device 210. For example, backend device 230 may indicate that user device 210 is to adjust playback to a different playback position, that user device 210 is to adjust playback speed to a different playback speed, etc.

In some implementations, backend device 230 may provide information identifying the parameter for synchronizing playback by adjusting content delivery. For example, backend device 230 may cause playback speed to be reduced for user device 210 by reducing the rate at which content is provided to user device 210. Additionally, or alternatively, backend device 230 may cause playback position to be adjusted for user device 210 by adjusting the position at which content is provided to user device 210.

In some implementations, backend device 230 may provide an indication of a playback adjustment to first user device 210 to synchronize playback with second user device 210. For example, when second user device 210 adjusts playback (e.g., pausing playback, resuming playback, etc.), backend device 230 may provide an indication of the playback adjustment to first user device 210.

In this way, a backend device may determine that content playback via a virtual theater is de-synchronized between multiple user devices, and may adjust a parameter so that content playback via the virtual theater is re-synchronized.

While systems and methods may be described herein in terms of a first user device and a second user device, the systems and methods may also be implemented in terms of a first user device and multiple other user devices.

Although FIG. 7 shows example blocks of process 700, in some implementations, process 700 may include additional blocks, different blocks, fewer blocks, or differently arranged blocks than those depicted in FIG. 7. Additionally, or alternatively, two or more blocks of process 700 may be performed in parallel.

FIGS. 8A and 8B are diagrams of an example implementation 800 relating to process 700 shown in FIG. 7. As shown in FIG. 8A, example implementation 800 includes user device 210-1, backend device 230, and user device 210-2. As shown by reference number 810, user device 210-1 indicates that playback, via a virtual theater, has been paused at a particular timestamp (e.g., "01:23:05"). As shown by reference number 820, backend device 230 receives the indication from user device 210-1. Backend device 230 determines, based on receiving the indication that playback has been paused for user device 210-1, that playback is to be paused at the particular timestamp for user device 210-2. Backend device 230 provides an indication that user device 210-2 is to pause playback at the particular timestamp based on determining that playback is to be paused. As shown by reference number 830, user device 210-2 receives the indication from backend device 230, reverts to the particular timestamp, and pauses playback to resynchronize with user device 210-1.

As shown in FIG. 8B, user device 210-1 resumes playback from the particular timestamp. As shown by reference number 840, user device 210-1 provides an indication, to backend device 230, that playback via the virtual theater has been resumed at the particular timestamp. As shown by reference number 850, backend device 230 determines to resume playback for user device 210-2 to maintain playback synchronization with device 210-1. Backend device 230 provides synchronization information to user device 210-2 associated with determining an offset for resuming playback. As shown by reference number 860, user device 210-2 receives the synchronization information from backend device 230, determines an offset playback position based on the synchronization information, and resumes playback at the offset playback position.

As indicated above, FIGS. 8A and 8B are provided merely as an example. Other examples are possible and may differ from what was described with respect to FIGS. 8A and 8B.

Figure 9A:
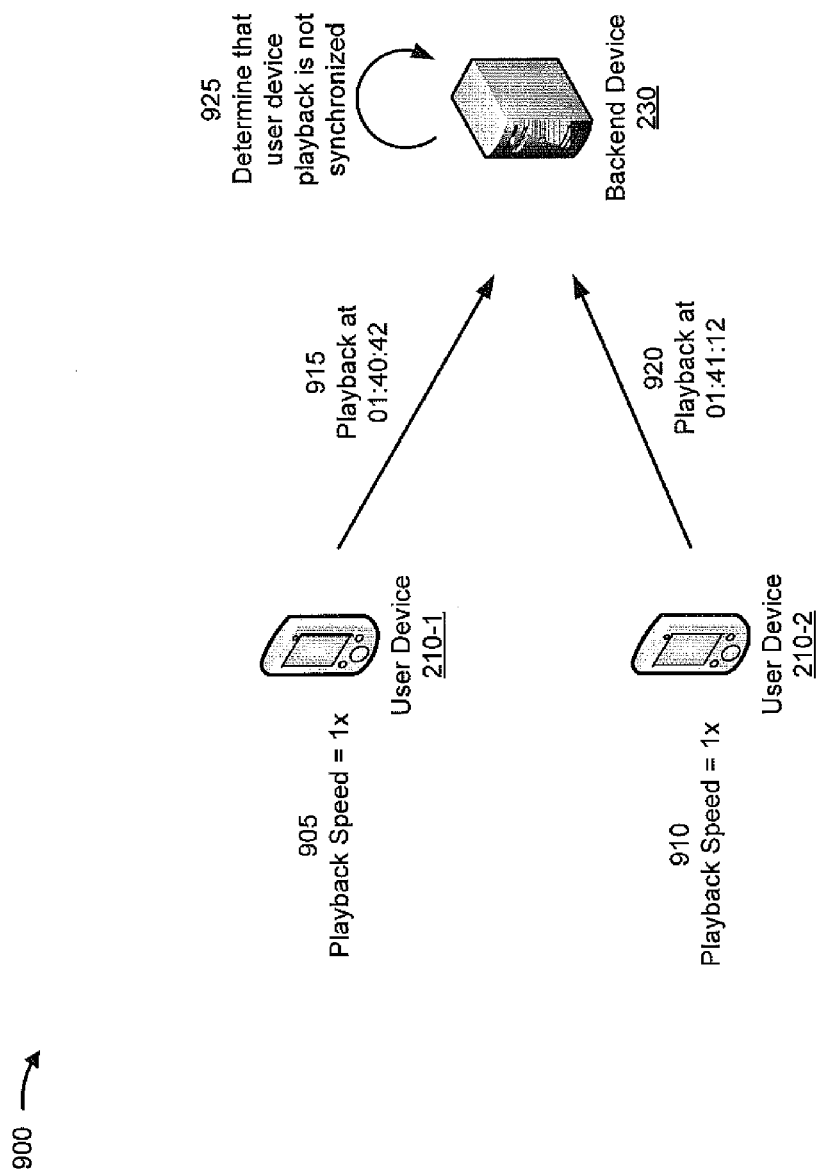

FIGS. 9A-9D are diagrams of another example implementation 900 relating to process 700 shown in FIG. 7. As shown in FIG. 9A, example implementation 900 includes user device 210-1, user device 210-2, and backend device 230. As shown by reference number 905, playback speed for user device 210-1 is set to normal (e.g. "1x"). As shown by reference number 910, playback speed for user device 210-2 is set to normal (e.g. "1x"). As shown by reference number 915, user device 210-1 provides an indication of a first playback position associated with user device 210-1 (e.g., "01:40:42") to backend device 230. As shown by reference number 920, user device 210-2 provides an indication of a second playback position associated with user device 210-2 (e.g., "01:41:12"). As shown by reference number 925, backend device 230 determines that the difference between the first playback position and the second playback position satisfies a de-synchronization threshold indicating that playback for user device 210-1 and user device 210-2 is not synchronized.

As shown in FIG. 9B, and by reference number 930, backend device 230 provides an indication to user device 210-1 that user device 210-1 is to increase playback speed. As shown by reference number 935, user device 210-1 increases playback speed to an elevated speed (e.g., "2x"). As shown by reference number 940, backend device 230 provides an indication to user device 210-2 that user device 210-2 is to decrease playback speed. As shown by reference number 945, user device 210-2 decreases playback speed to a reduced speed (e.g., "0.5x").

Figure 9C:
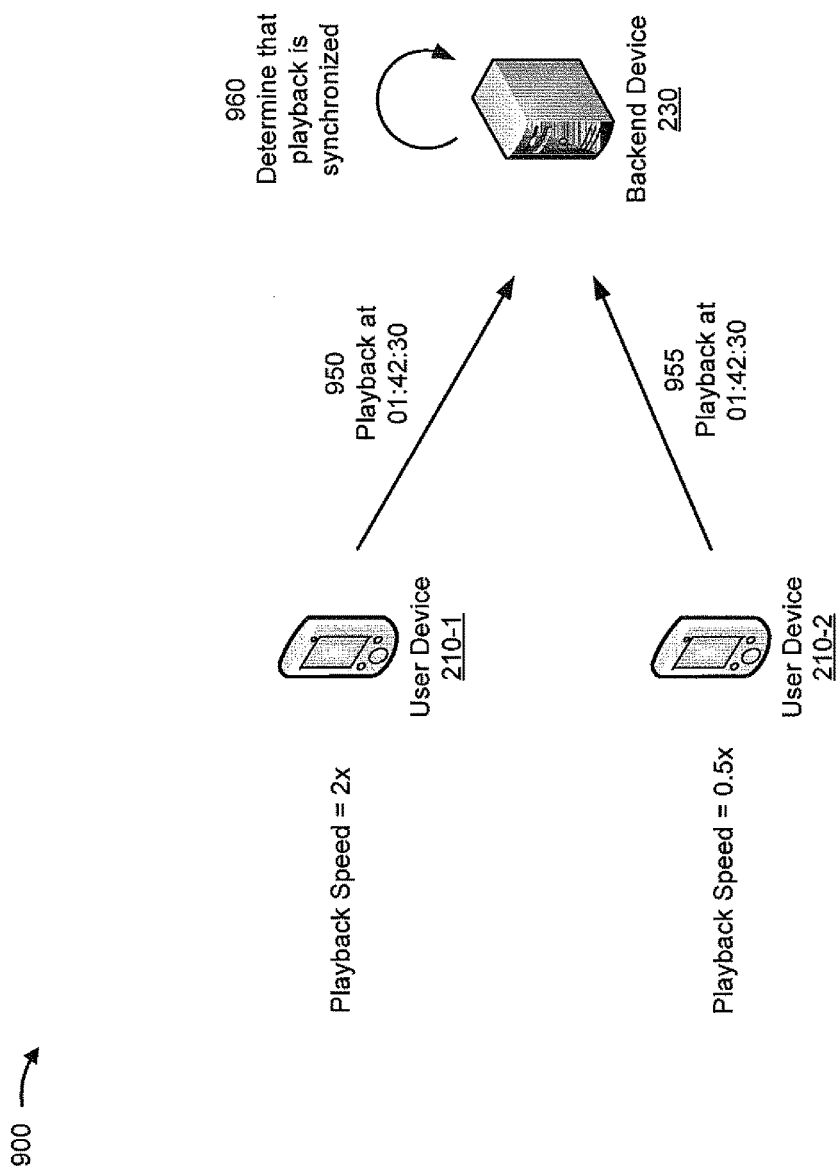

As shown in FIG. 9C, and by reference number 950, user device 210-1 indicates to backend device 230 that playback via the virtual theater is at a first playback position (e.g., "01:42:30"). As shown by reference number 955, user device 210-2 indicates to backend device 230 that playback via the virtual theater is at a second playback position (e.g., "01:42:30"). As shown by reference number 960, backend device 230 determines that user device 210-1 and user device 210-2 are re-synchronized based on the first playback position and the second playback position.

Figure 9D:
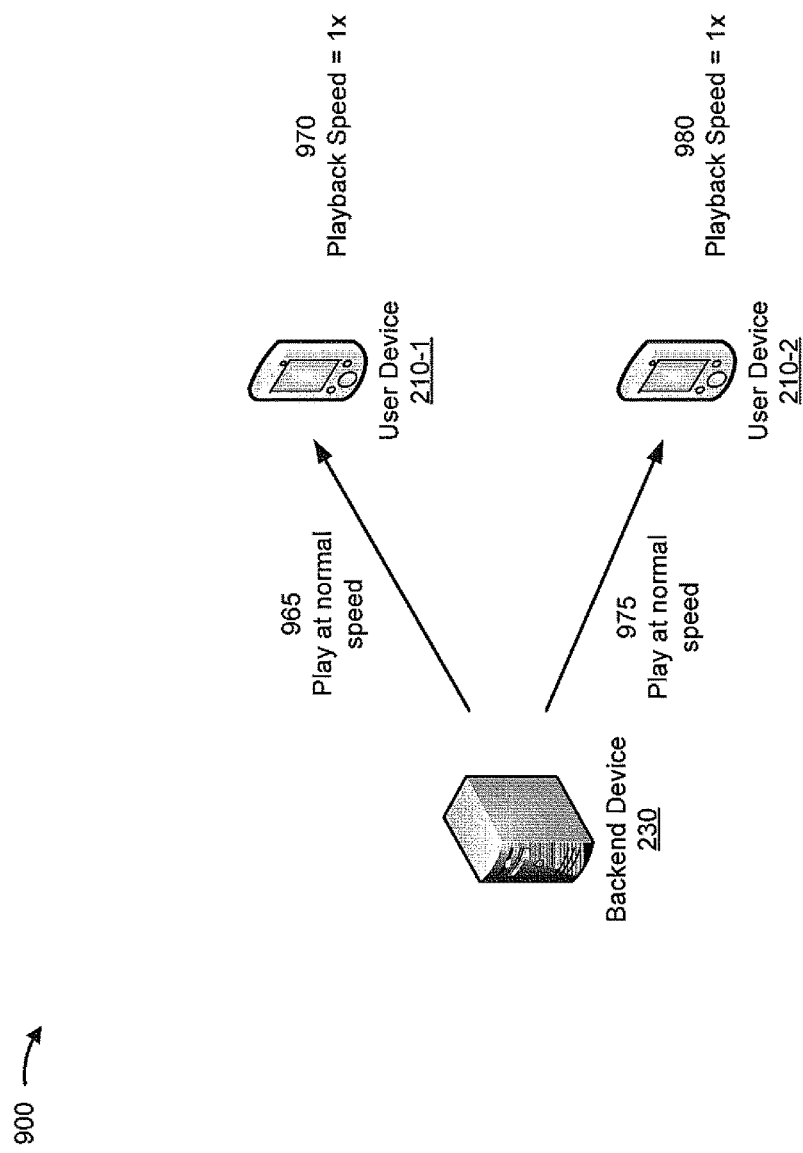

As shown in FIG. 9D, and by reference number 965, backend device 230 indicates to user device 210-1 that user device 210-1 is to adjust playback from the elevated speed (e.g., "2x") to the normal speed (e.g. "1x"). As shown by reference number 970, user device 210-1 adjusts playback to the normal speed. As shown by reference number 975, backend device 230 indicates to user device 210-2 that user device 210-2 is to adjust playback from the reduced speed (e.g., "0.5x") to the normal speed (e.g., "1x"). As shown by reference number 980, user device 210-2 adjusts playback to the normal speed.

As indicated above, FIGS. 9A-9D are provided merely as an example. Other examples are possible and may differ from what was described with respect to FIGS. 9A-9D.

Figure 10:
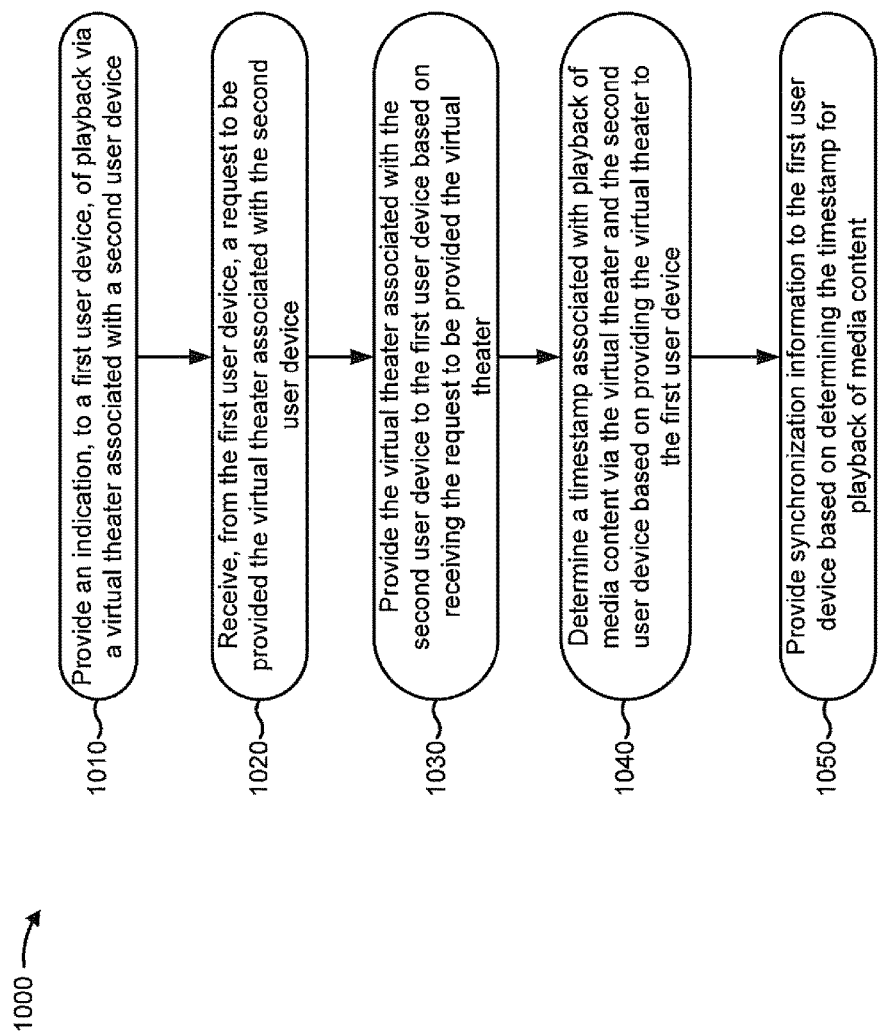
FIG. 10 is a flow chart of an example process for providing synchronized playback to a user device that requests to be provided an established virtual theater.

FIG. 10 is a flow chart of an example process for providing synchronized playback to a user device that requests to be provided an established virtual theater. In some implementations, one or more process blocks of FIG. 10 may be performed by backend device 230. Additionally or alternatively, one or more process blocks of FIG. 10 may be performed by another device or a group of devices separate from or including backend device 230, such as user device 210 and/or content provider 240.

As shown in FIG. 10, process 1000 may include providing an indication, to a first user device, of playback via a virtual theater associated with a second user device (block 1010). For example, backend device 230 may provide information to first user device 210 indicating that second user device 210 is being provided the virtual theater. In some implementations, the indication may include information associated with media content being provided via the virtual theater. For example, backend device 230 may provide an indication to first user device 210 of media content being provided to second user device 210 (e.g., audio content, visual content, etc.), a timestamp associated with the media content, or the like.

In some implementations, backend device 230 may provide the indication based on identifying a set of user devices 210 associated with first user device 210. For example, backend device 230 may determine that second user device 210 is associated with first user device 210 based on a social network service connection, and may indicate a status associated with second user device 210 (e.g., an indication of media content being provided to second user device 210, a timestamp for the media content, or the like).

As further shown in FIG. 10, process 1000 may include receiving, from the first user device, a request to be provided the virtual theater associated with the second user device (block 1020). For example, backend device 230 may receive the request to be provided the virtual theater associated with second user device 210 from first user device 210. In some implementations, the request may include information associated with identifying second user device 210, such as a device identifier, a service identifier, an email address, a username, or the like. In some implementations, the request may include information identifying a display device. For example, first user device 210 may provide information indicating that the display device is to be provided media content for playback via the virtual theater. In this case, first user device 210 may be provided a social interaction capability, a playback control capability, etc. associated with the virtual theater.

As further shown in FIG. 10, process 1000 may include providing the virtual theater associated with the second user device to the first user device based on receiving the request to be provided the virtual theater (block 1030). For example, backend device 230 may provide the virtual theater associated with second user device 210 to first user device 210. In some implementations, backend device 230 may provide a link to a particular web address associated with the virtual theater as discussed herein in connection with FIG. 4.

As further shown in FIG. 10, process 1000 may include determining a timestamp associated with playback of media content via the virtual theater and the second user device based on providing the virtual theater to the first user device (block 1040). For example, backend device 230 may determine the timestamp for playback associated with second user device 210. In some implementations, backend device 230 may determine the timestamp for playback associated with second user device 210 based on monitoring second user device 210, content provider 240, or the like. Additionally, or alternatively, backend device 230 may determine the timestamp for playback associated with second user device 210 based on receiving information from second user device 210. For example, backend device 230 may query second user device 210 to determine the timestamp for playback associated with second user device 210.

As further shown in FIG. 10, process 1000 may include providing synchronization information to the first user device based on determining the timestamp for playback of media content (block 1050). For example, backend device 230 may provide synchronization information to first user device 210. Synchronization information may refer to information associated with synchronizing playback of media content via the virtual theater between first user device 210 and second user device 210. For example, backend device 230 may provide, to first user device 210, the timestamp associated with playback via the virtual theater and second user device 210. Additionally, or alternatively, backend device 230 may provide synchronization information associated with determining an offset to the timestamp. For example, backend device 230 may determine an offset playback position for playback via first user device 210. Additionally, or alternatively, first user device 210 may determine the offset playback position based on the synchronization information.

Backend device 230 may provide information associated with determining a timestamp offset, in some implementations. For example, backend device 230 may provide information associated with offsetting a playback position from the timestamp based on a server response transmission latency (e.g., a quantity of time between backend device 230 providing the timestamp and first user device 210 receiving the timestamp). In some implementations, backend device 230 may provide a transmission timestamp associated with sending the synchronization information, and first user device 210 may compare the transmission timestamp to a reception timestamp to determine the server response transmission latency.

Additionally, or alternatively, backend device 230 may provide information associated with determining an authentication offset. An authentication offset may refer to an offset associated with a period of time during which backend device 230 authenticates and/or authorizes first user device 210 to receive playback of media content via the virtual theater. For example, backend device 230 may determine a quantity of time during which authentication and/or authorization is occurring, and may provide an indication of the quantity of time to first user device 210.

Additionally, or alternatively, backend device 230 may provide information associated with determining a buffering offset. A buffering offset may refer to an offset associated with a period of time during which media content is being buffered by first user device 210 prior to playback of the media content. For example, backend device 230 may determine a quantity of time during which media content is being provided to first user device 210 for buffering, and may provide an indication of the quantity of time to first user device 210. Additionally, or alternatively, backend device 230 may provide information indicating a timestamp for providing buffered playback, and first user device 210 may determine a buffering offset based on the provided timestamp.

In some implementations, user device 210 may provide media content at a playback position based on the synchronization information, and may provide the media content via the virtual theater at the playback position. For example, user device 210 may provide the media content at an offset playback position based on the timestamp associated with playback via the virtual theater and second user device 210 and/or based on information associated with a playback offset.

In this way, a backend device may provide information associated with synchronizing content playback to a first user device that joins a virtual theater associated with a second user device.

Although FIG. 10 shows example blocks of process 1000, in some implementations, process 1000 may include additional blocks, different blocks, fewer blocks, or differently arranged blocks than those depicted in FIG. 10. Additionally, or alternatively, two or more of the blocks of process 1000 may be performed in parallel.

Figure 11A:
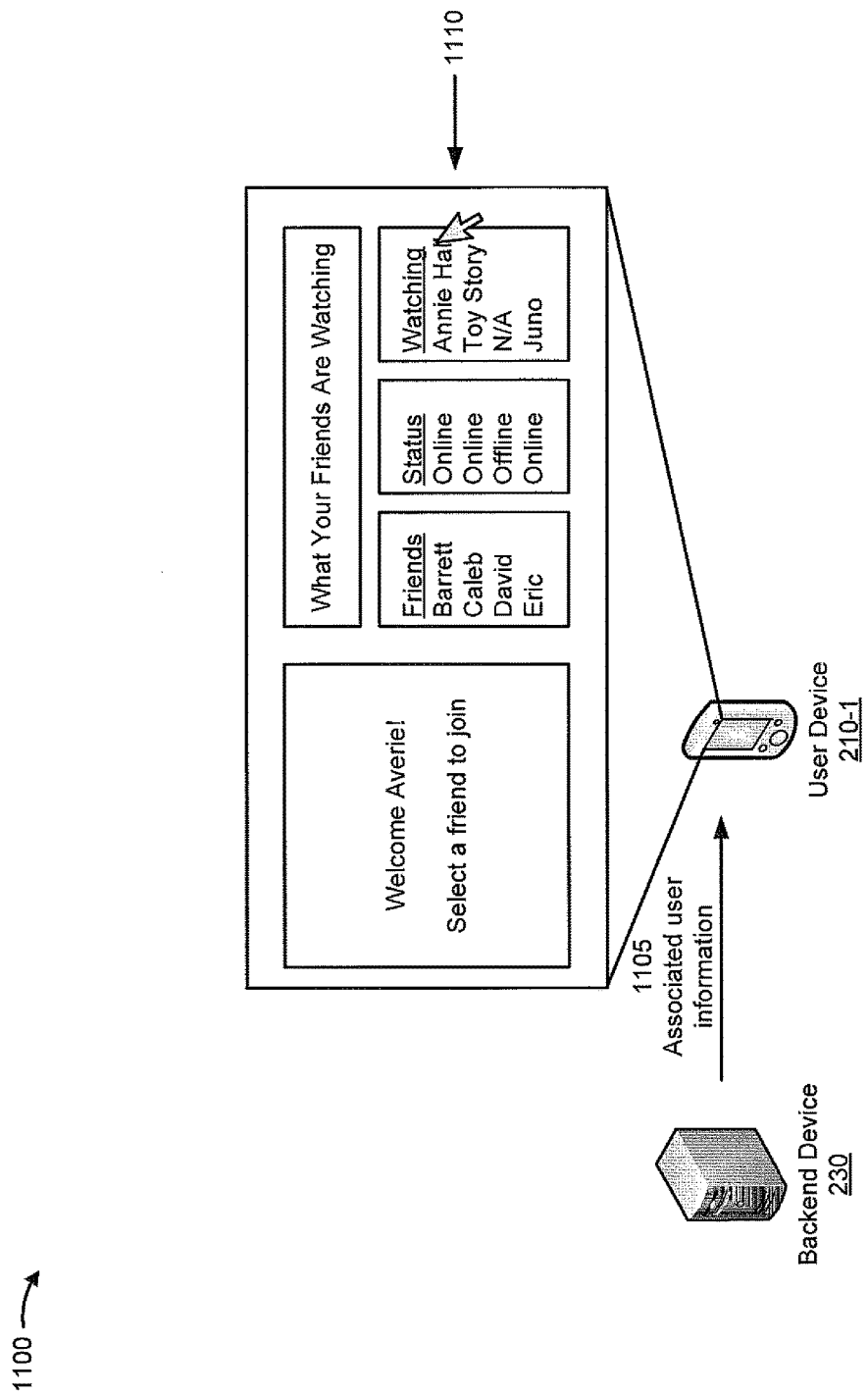
FIGS. 11A-11D are diagrams of an example implementation relating to the example process shown in FIG. 10.

FIGS. 11A-11D are diagrams of an example implementation 1100 relating to process 1000 shown in FIG. 10. As shown in FIG. 11A, example implementation 1100 includes backend device 230 and user device 210-1. Assume that a first user (e.g., "Averie") is associated with user device 210-1. As shown by reference number 1105, backend device 230 provides information identifying a viewing status of a set of other users associated with user Averie. As shown by reference number 1110, and based on an interaction with a link, user Averie indicates that a virtual theater, associated with one of the other users (e.g., "Barrett"), is being used to view a movie (e.g., "Annie Hall").

Figure 11B:
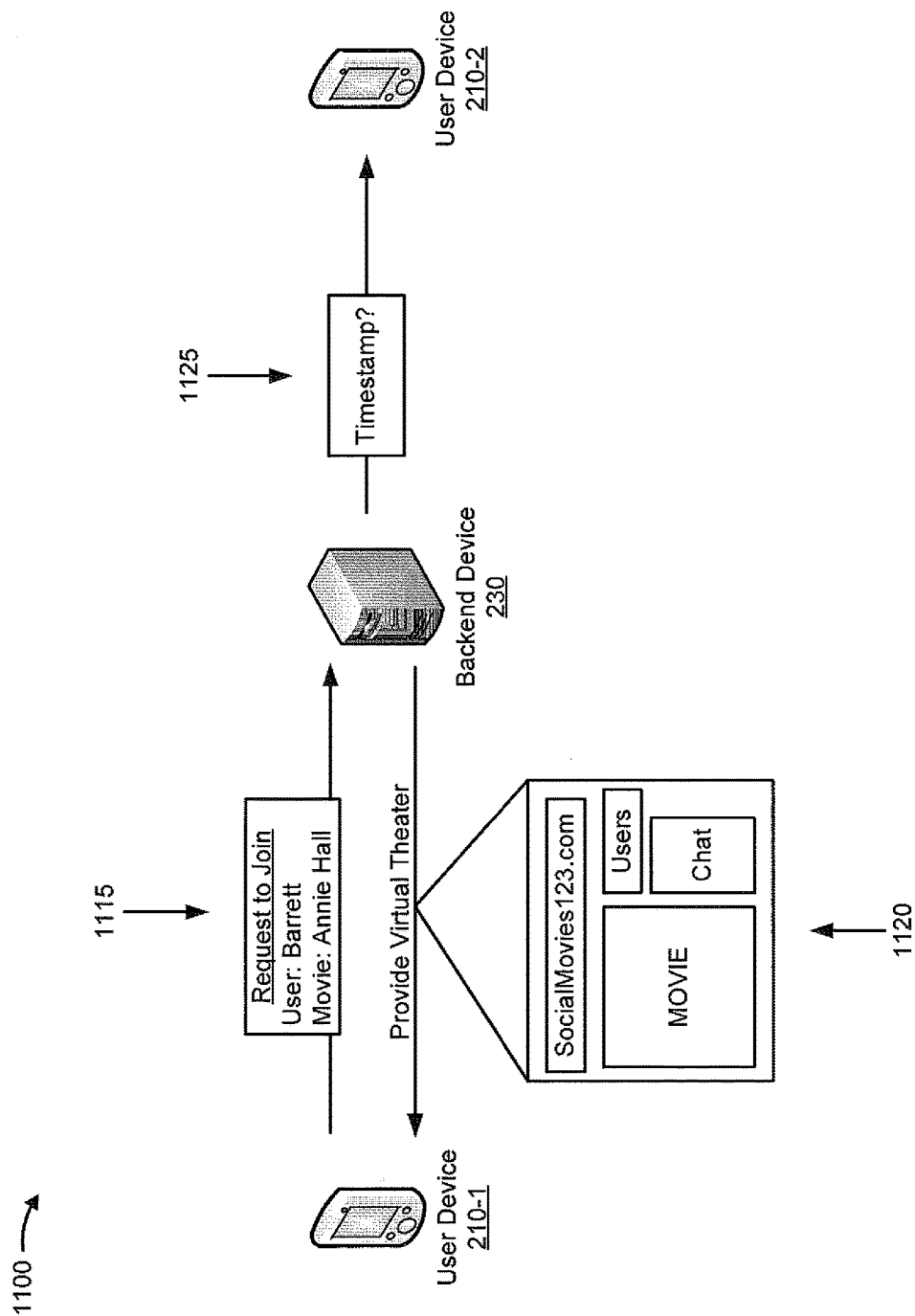

As shown in FIG. 11B, and by reference number 1115, user device 210-1 provides, to backend device 230, a request to join the virtual theater being provided to user Barrett. As shown by reference number 1120, based on the request to join the virtual theater, backend device 230 provides the virtual theater to user device 210-1. Assume that user device 210-2 is associated with user Barrett. As shown by reference number 1125, backend device 230 requests that user device 210-2 provide a timestamp associated with playback of Annie Hall.

Figure 11C:
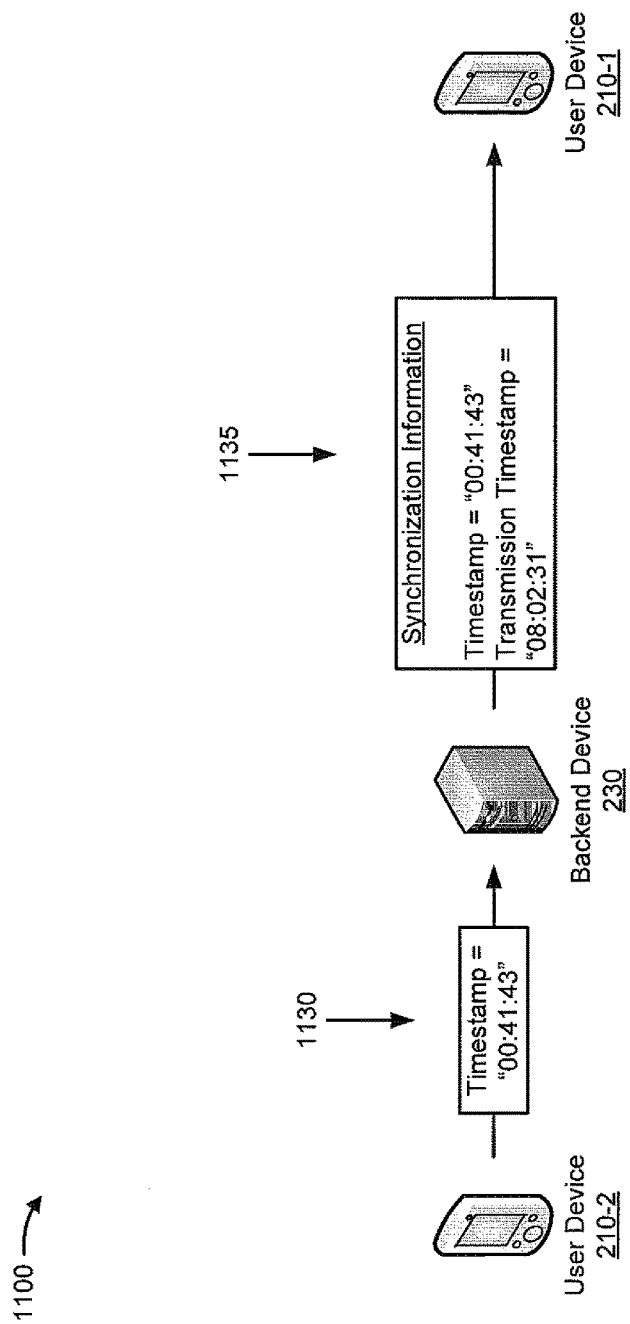

As shown in FIG. 11C, and by reference number 1130, backend device 230 receives information identifying the timestamp associated with playback of Annie Hall (e.g., "00:41:43") via the virtual theater and user device 210-2. As shown by reference number 1135, backend device 230 provides synchronization information to user device 210-1 identifying the timestamp received from user device 210-2 and a transmission timestamp (e.g., "08:02:31") associated with sending the synchronization information to user device 210-1.

Figure 11D:
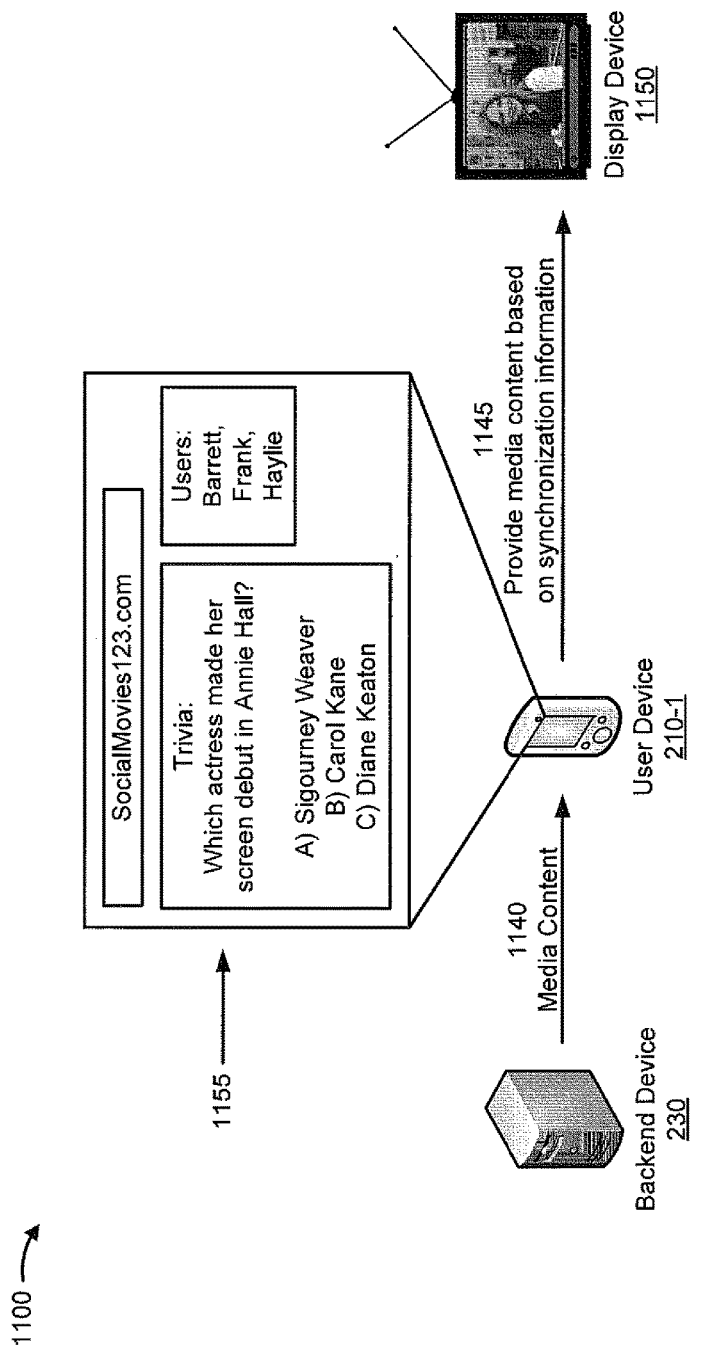

As shown in FIG. 11D, and by reference number 1140, backend device 230 provides Annie Hall to user device 210-1. Assume that, user device 210-1 determines an offset playback position for Annie Hall based on the synchronization information received from backend device 230 (e.g., based on the timestamp associated with user device 210-2, the transmission timestamp, a reception timestamp associated with receiving the synchronization information, etc.). As shown by reference number 1145, user device 210-1 provides Annie Hall at the offset playback position to display device 1150. As shown by reference number 1155, user device 210-1 provides a trivia capability and information identifying a set of users also being provided the virtual theater (e.g., "Users: Barrett, Frank, Haylie") via a display associated with user device 210-1.

As indicated above, FIGS. 11A-11D are provided merely as an example. Other examples are possible and may differ from what was described with regard to FIGS. 11A-11D.

Implementations described herein may assist a backend device in establishing a virtual theater for providing media content to multiple user devices, and in maintaining playback synchronization for the multiple user devices. Furthermore, implementations described herein may assist the backend device in providing the virtual theater to another user device for synchronized playback.

As indicated above, while systems and methods may be described herein in terms of a virtual theater providing video, the systems and methods may also be implemented in terms of a virtual theater providing audio. For example, a backend device may provide a song, an album, an audiobook, a podcast, a concert, etc. via the virtual theater.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
a memory; and
one or more processors, implemented at least partially in hardware, to:
  receive, from a content provider of media content, a request to establish a virtual theater for viewing the media content;
  identify a plurality of user devices after receiving the request to establish the virtual theater,
    the plurality of user devices including:
      a first user device, of a first user, that receives a notification regarding the virtual theater, and
      a second user device, of a second user, selected by the first user, as a response to the notification, to view the media content, via the virtual theater, together with the first user;
  provide, to the plurality of user devices, information regarding a transaction and one or more playback options for the virtual theater,
    the transaction relating to establishing the virtual theater, and
    the one or more playback options including a start time option;
  receive, from the first user device, first playback preference information,
    the first playback preference information including information identifying a first time selected by the first user for the start time option;
  receive, from the second user device, second playback preference information, the second playback preference information including information identifying a second time selected by the second user for the start time option;
select a start time based on the first playback preference information and the second playback preference information;
provide, to the plurality of user devices, an indication of the media content and the selected start time; and
establish the virtual theater to provide, to the plurality of user devices, the media content via the virtual theater at the selected start time.

2. The device of claim 1,
where the one or more processors are further to:
determine a first playback position associated with the first user device;
determine a second playback position associated with the second user device;
determine that a difference between the first playback position and the second playback position satisfies a threshold; and
determine that the media content is not synchronized based on determining that the difference between the first playback position and the second playback position satisfies the threshold.

3. The device of claim 1,
where the one or more processors are further to:
determine an application programming interface call associated with modifying playback via the virtual theater; and
provide information associated with utilizing the application programming interface call to modify playback.

4. The device of claim 1,
where the one or more processors, when providing the information regarding the transaction and the one or more playback options for the virtual theater, are to:
indicate that the transaction is to occur when a quantity of the plurality of user devices satisfies a threshold quantity; and
where the one or more processors, when establishing the virtual theater, are further to:
determine that the quantity of the plurality of user devices satisfies the threshold quantity; and
establish the virtual theater based on determining that the quantity of the plurality of user devices satisfies the threshold quantity.

5. The device of claim 1,
where the one or more processors, when providing the information regarding the transaction and the one or more playback options for the virtual theater, are to:
indicate that the transaction is to include a particular cost; and
transact with the plurality of user devices to assign fractions of the particular cost to each user device of the plurality of user devices; and
where the one or more processors, when establishing the virtual theater, are to:
establish the virtual theater based on transacting with the plurality of user devices to receive payment information relating to the fractions of the particular cost assigned to each user device of the plurality of user devices.

6. The device of claim 1,
where the one or more processors are further to:
receive information associated with selecting a transmission mode for providing the media content via the virtual theater; and
select a broadcast transmission mode for providing the media content via the virtual theater based on receiving the information associated with selecting the transmission mode; and
where the one or more processors, when providing the media content via the virtual theater, are to:
provide the media content, via the virtual theater, using the broadcast transmission mode.

7. The device of claim 1,
where the one or more processors are further to:
receive transaction information associated with establishing the virtual theater based on providing the information regarding the transaction; and
where the one or more processors, when establishing the virtual theater, are further to:
establish the virtual theater based on receiving the transaction information associated with establishing the virtual theater.

8. A non-transitory computer-readable medium storing instructions, the instructions comprising:
one or more instructions that, when executed by one or more processors, cause the one or more processors to:
receive, from a content provider of media content, a request to establish a virtual theater for viewing the media content;
identify a first user device, of a first user, and a second user device, of a second user, selected by the first user, after receiving the request to establish the virtual theater,
the first user device being notified regarding the virtual theater, and
the second user being selected by the first user, as a response to the first user device being notified, to view the media content, via the virtual theater, together with the first user;
provide, to the first user device and the second user device, information regarding a transaction and one or more playback options for the virtual theater,
the transaction relating to establishing the virtual theater, and
the one or more playback options including a start time option;
receive, from the first user device, first playback preference information,
the first playback preference information including information identifying a first time, selected by the first user, for the start time option;
receive, from the second user device, second playback preference information,
the second playback preference information including information identifying a second time selected by the second user for the start time option;
select a start time based on the first playback preference information and the second playback preference information;
provide, to the first user device and the second user device, an indication of the media content and the selected start time; and
establish the virtual theater to provide, to the first user device and the second user device,
the media content via the virtual theater at the selected start time.

9. The non-transitory computer-readable medium of claim 8, where the one or more instructions, when executed by the one or more processors, further cause the one or more processors to:

monitor the first user device and the second user device to determine playback information;
determine that playback of the media content, via the virtual theater, is not occurring synchronously for the first user device and the second user device based on monitoring the first user device and the second user device to determine playback information;
determine, based on the playback information, a parameter for synchronizing the playback of the media content for the first user device and the second user device; and
provide information identifying the parameter for synchronizing the playback of the media content for the first user device and the second user device.

10. The non-transitory computer-readable medium of claim 8,
where the one or more instructions further cause the one or more processors to:
determine a particular program to be provided via the virtual theater based on one or more selections of the first user,
the media content corresponding to the particular program; and
provide the particular program via the virtual theater.

11. The non-transitory computer-readable medium of claim 8,
where the one or more instructions, when executed by the one or more processors, further cause the one or more processors to:
determine a social interaction configuration associated with the virtual theater; and
where the one or more instructions, that cause the one or more processors to establish the virtual theater, cause the one or more processors to:
establish the virtual theater based on determining the social interaction configuration associated with the virtual theater.

12. The non-transitory computer-readable medium of claim 8,
where the one or more instructions, when executed by the one or more processors, cause the one or more processors to:
provide, to the first user device, an invitation to have the virtual theater established for viewing the media content based on receiving the request to establish the virtual theater from the content provider.

13. The non-transitory computer-readable medium of claim 8,
where the one or more instructions, when executed by the one or more processors, further cause the one or more processors to:
receive information associated with selecting a transmission mode for providing the media content via the virtual theater; and
select a multicast transmission mode for providing the media content via the virtual theater based on receiving the information associated with selecting the transmission mode; and
where the one or more instructions further cause the one or more processors to:
provide the media content using the multicast transmission mode.

14. The non-transitory computer-readable medium of claim 8, where the one or more instructions, when executed by the one or more processors, further cause the one or more processors to:
provide, to the first user device and the second user device, information indicating that a payment may be split amongst the first user device and the second user device.

15. A method, comprising:
receiving, by a device and from a content provider of media content, a request to establish a virtual theater for viewing the media content;
identifying, by the device, a plurality of user devices after receiving the request to establish the virtual theater,
the plurality of user devices including:
a first user device, of a first user, that receives a notification regarding the virtual theater, and
a second user device, of a second user, selected by the first user, as a response to the notification, to view the media content, via the virtual theater, together with the first user;
providing, by the device, information regarding a transaction and one or more playback options for the virtual theater,
the transaction relating to establishing the virtual theater, and
the one or more playback options including a start time option;
receiving, by the device and from the first user device, first playback preference information,
the first playback preference information including information identifying a first time selected by the first user for the start time option;
receiving, from the second user device, second playback preference information,
the second playback preference information including information identifying a second time selected by the second user for the start time option;
selecting, by the device, a start time based on the first playback preference information and the second playback preference information;
providing, by the device and to the plurality of user devices, an indication of the media content and the selected start time; and
establishing, by the device, the virtual theater to provide, to the plurality of user devices,
the media content via the virtual theater at the selected start time.

16. The method of claim 15, further comprising:
determining that playback of the media content being provided via the virtual theater to the first user device is not synchronized with playback of the media content being provided via the virtual theater to the second user device;
determining a playback adjustment for the first user device associated with synchronizing the playback between the first user device and the second user device; and
providing information identifying the playback adjustment to the first user device.

17. The method of claim 16,
where determining the playback adjustment comprises:
configuring playback for the first user device to occur at a different playback speed than a current playback speed for the first user device; and
where providing the information identifying the playback adjustment comprises:
providing, to the first user device, information identifying the different playback speed.

18. The method of claim 16,
where determining the playback adjustment comprises:

determining a playback position associated with the second user device; and configuring the playback for the first user device to occur at the playback position associated with the second user device; and where providing the information identifying the playback adjustment comprises:

providing information associated with configuring the playback for the first user device to occur at the playback position associated with the second user device.

19. The method of claim 15, further comprising:

providing, to the first user device, information identifying the virtual theater, the virtual theater being provided to the second user device;

receiving a request from the first user device to be provided the virtual theater;

providing the virtual theater to the first user device, determining a timestamp associated with playback of the media content for the second user device via the virtual theater;

determining a playback offset associated with playback of the media content via the virtual theater based on determining the timestamp; and providing, to the first user device, synchronization information associated with determining a playback position for the playback of the media content via the virtual theater based on the timestamp and the playback offset.

20. The method of claim 15, further comprising:

transacting, with the first user device, to establish the virtual theater; and providing an entitlement to the first user device, the entitlement indicating that the first user of the entitlement is permitted to be provided the virtual theater.

* * * * *